United States Patent
Tapper et al.

(10) Patent No.: US 7,370,248 B2
(45) Date of Patent: May 6, 2008

(54) IN-SERVICE RAID MIRROR RECONFIGURING

(75) Inventors: Gunnar Tapper, Woodland Park, CO (US); Gary S. Smith, Auburn, CA (US); Marty Guericke, Campbell, CA (US); Vijay M. Bellam, Cupertino, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 235 days.

(21) Appl. No.: 10/704,478

(22) Filed: Nov. 7, 2003

(65) Prior Publication Data

US 2005/0102603 A1    May 12, 2005

(51) Int. Cl.
*G11C 29/00* (2006.01)
*G06F 11/00* (2006.01)
(52) U.S. Cl. .................. 714/718; 714/770; 714/7
(58) Field of Classification Search ............... 707/204; 714/13, 770, 6–7
See application file for complete search history.

(56) References Cited

U.S. PATENT DOCUMENTS

| | | | |
|---|---|---|---|
| 4,590,554 A * | 5/1986 | Glazer et al. ................. 714/13 |
| 6,058,455 A | 5/2000 | Islam et al. |
| 6,058,489 A * | 5/2000 | Schultz et al. ................. 714/7 |
| 6,377,958 B1 | 4/2002 | Orcutt |
| 6,449,733 B1 * | 9/2002 | Bartlett et al. ................ 714/13 |
| 6,490,598 B1 * | 12/2002 | Taylor ........................ 707/204 |
| 6,502,205 B1 * | 12/2002 | Yanai et al. ................... 714/7 |
| 6,535,994 B1 * | 3/2003 | Kedem .......................... 714/6 |
| 6,600,967 B2 * | 7/2003 | Milligan et al. ............. 700/214 |
| 6,622,261 B1 | 9/2003 | Laranjeira et al. |
| 6,658,589 B1 * | 12/2003 | Taylor .......................... 714/6 |
| 6,766,491 B2 * | 7/2004 | Busser ....................... 714/770 |
| 6,898,668 B2 * | 5/2005 | Thompson et al. ......... 711/114 |
| 2001/0056438 A1* | 12/2001 | Ito .............................. 707/204 |
| 2003/0097533 A1* | 5/2003 | Maeda et al. ............... 711/162 |
| 2003/0120386 A1* | 6/2003 | Milligan et al. ............ 700/245 |

* cited by examiner

*Primary Examiner*—Cynthia Britt

(57) ABSTRACT

This disclosure describes a technique including operating a redundant disk drive device, wherein the redundant disk drive device includes a primary disk drive and at least one mirror disk drive. At least one of the disk drives is reconfigured within the redundant disk drive system in such a manner that during the reconfiguring, the disk drive is maintained on-line.

26 Claims, 6 Drawing Sheets

IN-SERVICE RAID MIRROR RECONFIGURING

BACKGROUND

It is important that computer data storage systems can reliably maintain data stored in a disk drive in case of a particular memory failure or error. One commercially available technique for increasing disk drive reliability relies upon redundant data storage on disks such as "Redundant Array of Inexpensive Disks" (RAID) systems. Raid systems are currently used in many computer systems that demand improved reliability for data storage while utilizing relatively inexpensive memory disks. For example, banking and secure transactions over the Internet often rely upon RAID systems.

Certain levels of RAID involve the use of mirror disks, in which data is copied from among different disks. Today, changing such mirror-related configurations of RAID arrays has the disk volume go off-line. It would therefore be desirable to provide a mechanism to improve the reliability and reduce the down-time of RAID systems that result from reconfiguring of the disk drives.

BRIEF DESCRIPTION OF THE DRAWINGS

The same numbers are used throughout the drawings to reference similar features and components.

DETAILED DESCRIPTION

Figure 1:
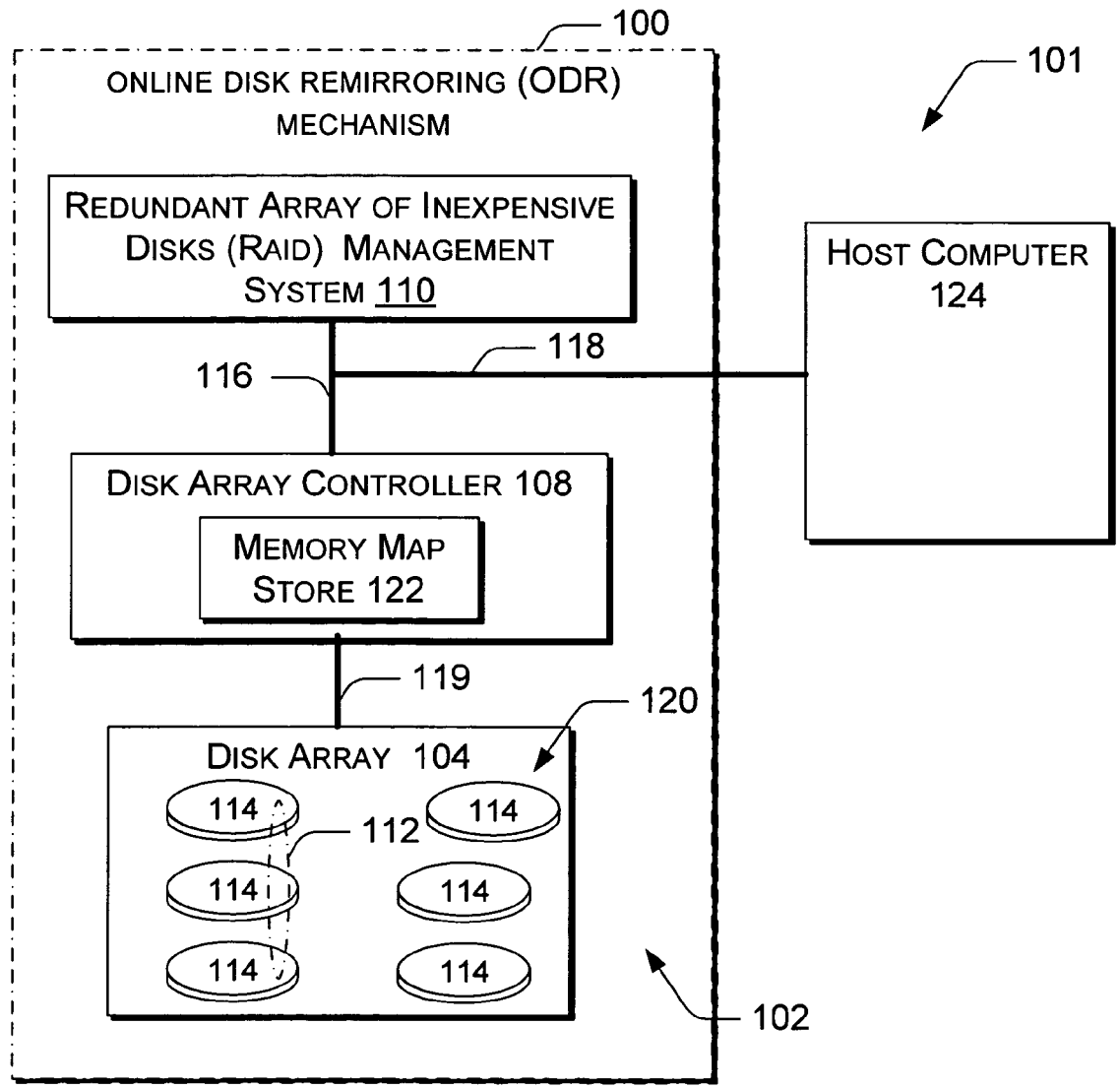
FIG. 1 is a cross-sectional view of one embodiment of the invention showing a computer environment including a RAID system.

Much has gone into the development of disk drives. Disk drives provide one technique to store large amounts of data in a random access memory (RAM) format for such uses as databases. Disk drive reliability is especially important in critical RAM and database applications such as banking, finance, security, and personal matters. One technique that increases the reliability of disk drives involves so-called "Redundant Array of Inexpensive Disks" (RAID) systems.

The RAID protocol is subdivided into a number of RAID levels, each RAID level provides different functionality. RAID level-1 is also known as "RAID mirroring" in which data from a primary disk drive is copied (i.e., "mirrored") into one or more mirror disk drives. RAID mirroring improves redundancy, lowers latency, increases bandwidth for reading and/or writing data, and allows for recoverability from hard-disk crashes. This disclosure describes a number of RAID mirror embodiments that reconfigure host-based RAID mirrors while keeping the RAID system on-line.

In RAID level-1 mirror systems, each mirror disk drive (and there may be a number thereof) acts to store identical data to that stored in the primary disk drive to provide a redundant storage of data. Data stored in the disk drives of the RAID array can be compared using the RAID algorithms. If one disk drive (either the primary disk drive or one of the mirror disk drive) contains inconsistent data compared to other disk drives, then a RAID algorithm can determine which data set(s) to rely upon using error handling techniques.

RAID systems that operate based on a RAID protocol include disk arrays in which part of the physical storage capacity is used to store redundant information about user data. The redundant data is stored on other portions of the physical storage. The redundant information enables regeneration of user data in the event that one of the array's member disks (or the access path thereto) fails.

Each RAID disk drive may be configured as a non-volatile, randomly accessible, rewritable mass storage device. The physical mass storage device of each RAID disk drive can include (but is not limited to) rotating magnetic disks, rotating optical disks, solid-state disks, non-volatile electronic storage elements [e.g., programmable memories (PROMs), erasable programmable memories (EPROMs), and electrical erasable programmable memories (EE-PROMs)], and/or flash drives.

This disclosure provides a mechanism by which the RAID disks are maintained on-line while re-configuring the RAID system. By maintaining the RAID system on-line during reconfiguring, the users of computer environments can experience continued operation of the application programs. Although an illustrative RAID Level 1 system is described as being reconfigured in the present disclosure, the on-line reconfiguring concepts disclosed herein are applicable to other RAID and other redundant non-RAID systems. As RAID and other redundant disk systems are becoming more commonplace, allowing the application programs to run more continuously is becoming more important.

To maintain the RAID system on-line while being reconfigured, process pairs are used to access information from the disk drive. The process pair includes a first processor running a first process that relates to a first copy of an image of an operating system. The process pair further includes a second processor (that in certain embodiments may actually he the first processor) running a second process that relates to a second copy of an image of an operating system. The use of multiple processors running multiple processes is referred to as a clustered system.

To change the state of a RAID system, an operation that results in a change of the state is initially performed relative to the first processor/process while activity in the second processor/process is maintained. An operation that results in a change of the state is then performed relative to the second processor/process while any activity in the first processor/process is maintained.

By using this technique by which the state in one or two processes are maintained while the other one is being changed (either the second process is maintained while the first process is modified, or vice versa), the RAID system can be maintained on-line during disk reconfiguration process. In current systems that rely on a single process, the RAID system has to be taken off line to reduce the potential for errors. As such, the present disclosure provides a mechanism by which the RAID system can be maintained online continuously during the reconfiguration processes.

Certain embodiments of RAID systems are capable of error handling by which data or operational errors of the RAID drives are handled. The techniques by which a RAID system can detect and handle errors can vary between different RAID disk drives. In this disclosure, the RAID disk drives can undergo on-line error handling while being reconfigured.

Error handling can be more reliably performed using the process pair as described above. For example, if an error is detected in the first processor/process as the change of the state is initially performed relative to the first processor/process, then the state of the first processor/process can be returned to its original state using the state of the second processor/process before the state of the second processor/process of the process pair is changed.

By comparison, if the first processor/process of the process pair is successfully changed (and does not invoke error handling), then the second processor/process in the process pair will be attempted to be changed. If an error is detected in the second processor/process, then the overall process will be forwarded to the state of the first processor/process that has already been changed based on the changed state of the first processor/process. This technique allows for reconfiguration the RAID system (one process at a time) while maintaining the RAID system online, which is important to provide continual application support.

There are several aspects about how to reconfigure the RAID disk drive during the RAID disk drive using the reconfiguring and/or mirroring processes as described in this disclosure. One aspect of the RAID disk drive reconfiguring process is that users should be able to mirror an unmirrored disk volume without taking the disk volume out of service. The rationale for this aspect is that users do not want to take their applications out of service to change the disk configuration from an unmirrored configuration to a mirrored configuration.

Another aspect is that users should be able to unmirror a mirrored disk volume without taking the disk volume out of service since users do not want to take their applications out of service to change the disk configuration from mirrored to unmirrored.

Another aspect is that users should be able to reconfigure a mirrored disk volume to use a disk drive in an alternate location without taking the disk volume out of service. One rationale for this aspect is that users do not want to take their applications out of service to change the disk configuration to use a different disk drive. The disk drives of the mirrored disk volume should be synchronized before another mirror-oriented reconfiguring is performed. In other words, if the user wants to move both halves of a mirrored disk volume, then the user should move one disk drive at a time and allow the disk revive to complete before the other disk drive is moved.

Yet another aspect of the disclosed ODR mechanism is that users should be able to switch roles between the primary and mirror disk drives of a mirrored disk volume without taking the disk volume out-of-service. A rationale for this aspect is that users should be provided continued service without taking their applications out of service to perform this type of configuration change.

Another aspect of the disclosed ODR mechanism is that users should be able to replace a failing disk drive of a mirrored disk volume 112 while being physically off-site. A rationale for this aspect is that there may be no users at the site where the ODR mechanism is physically housed. In these situations, users still need to be able to replace a disk drive that is showing sign of incipient failure without having to go onsite and physically replace the disk drive. One technique to meet this desired aspect is to provide a number of non-configured disk drives to the system, thereby allowing the off-site user to do an Online Disk Replacement to replace the ailing disk drive with one of the spare disk drives.

Another aspect described in this disclosure is known as "Disk Sparing", in which certain disk drives should not be configured automatically within the ODR mechanism 100 since they can be used as part of a pool of spare disk drives. This pool of spare disk drives can allow the user to configure the system to automatically replace a failed disk drive with one of the spare disk drives by performing an automated ODR mechanism that starts a disk revive.

Another aspect of this disclosure is that users should be able to configure their system to automatically perform an Online Disk Replacement using one of a pool of spare disk drives. Another aspect of the disclosed ODR mechanism 100 is that users should be able to script actions such as moving from a non-interleaved to an interleaved disk configuration. A rationale for this aspect is that moving from a non-interleaved to an interleaved disk configuration may change the configuration for a large number of disks, including actions such as power off the disk drive to be moved to its new location. If the user intends to physically move the disk drives, then it's acceptable to have the user make use of two scripts, one that prepares the disk drives to be moved (including power the disk drive off) and another that completes the configuration changes once the disk drives have been moved.

I. General Disk Reconfiguring System

As described with respect to FIG. 1, a RAID disk drive may be included in a data storage system such as a RAID system 102 that operates within a computer environment 101. Certain illustrative computing embodiments 101, as now described with respect to FIG. 1, are configured with suitable hardware and/or software to provide an online disk remirroring (ODR) mechanism 100 that can reconfigure a RAID disk drive based on process pair concepts. The computer environment 101 may be configured as a distinct computer or a networked computer system, as is generally known with computers. The embodiment of the RAID system 102 of FIG. 1 can be configured as including a hierarchic (or non-hierarchical) disk array 104. The disk array 104 includes a plurality of storage disk drives 114 for implementing a RAID storage system.

One embodiment of the RAID system 102 includes a disk array controller 108 that is coupled to the disk array 104 to coordinate data transfer to and from the storage disk drives 114. The RAID system 102 further includes a RAID management system 110 that provides a mechanism to reconfigure an array of host-based RAID level-1 mirror disk drives without taking the disk drives 114 out-of-service (and resulting in taking application programs that run on many of the disk drives off-line). Arrays of RAID disks typically include a plurality of the storage disk drives 114, the hardware used to connect the storage disk drives to a host computer(s) 124, and management software that controls the operation of the physical disk drives 114. The RAID system 102 is coupled to a host computer 124 via an I/O interface bus 118. The software, hardware, and/or firmware of the RAID system 102 can present the data stored in the storage disk drives 114 in such a manner that many of the storage disk drives 114 within the disk array 104 can appear to the users as a virtual disk running on the host computer 124. The "virtual disk" may be realized in the disk array using the management software.

The disk array controller 108 is coupled to the disk array 104 via one or more interface buses 119, such as a commercially available small computer system interface (SCSI), ATA, Universal Serial Bus (USB), FibreChannel, IEEE 1394, etc. The RAID management system 110 is operatively coupled to a disk array controller 108 via an interface protocol 116. The RAID management system 110 can be configured either as a separate component as shown, or contained within the disk array controller 108 or within the host computer 124. The RAID management system 110 and the disk array controller 108 together provide the process pair functionality to the disk array 104. The process pair functionality includes a first processor that runs a first process relating to a first copy of the operating system, and a second processor that runs a second process relating to a second copy of the operating system. The components of the process pairs (the processors, the processes, and the copies of the operating systems) are not shown due to the variety of potential implementations. The RAID management system 110 can provide a data manager for controlling disk storage and reliability levels, and for transferring data among various reliability storage levels. The RAID management system 110 can also implement distributed write disk logging.

In the system shown, the disk array controller 108 is provided as a single or multiple controllers. The methods disclosed within this disclosure can be practiced with a single disk array controller 108, more than two controllers, or other architectures.

The disk array 104 can be characterized as different storage spaces, including its physical storage space and one or more virtual storage spaces. For example, storage disk drives 114 in disk array 104 is conceptualized as being arranged in a disk volume 112 of multiple disks 114. These various views of storage are related through mapping techniques. For example, the physical storage space of the RAID system 102 is mapped into a virtual storage space that delineates storage areas according to the various data reliability levels. Some areas within the virtual storage space are allocated for a first reliability storage level, such as RAID mirror (RAID level-1) and other areas are allocated for another reliability storage level such as parity or striping. These areas may be configured on the same or separate disks or any combination thereof.

The RAID system 102 can include a memory map store 122 that provides for persistent storage of the virtual mapping information used to map the disk array 104. The memory map store 122 is external to the disk array (and is resident in the disk array controller 108). The memory mapping information is updated continually or at regular (or irregular) intervals by the disk array controller 108 or RAID management system 110 as the various mapping configurations among the different views change.

The memory map store 122 can be embodied as one or more non-volatile Random Access Memory within the disk array controller 108. The memory map store 122 provides for redundant storage of the memory mapping information that can be used to provide the process pair (two processes with two copies of the operating system). The virtual mapping information is duplicated and stored in the memory map store 122 according to mirror redundancy techniques. In this manner, the memory map store 122 is dedicated to storing the original mapping information and the redundant mapping information.

As indicated, the disk array 104 includes multiple storage disk drives 114 (which may also be configured as multiple locations within a single disk drive device to store redundant data). The management of data on redundant storage disk drives 114 is coordinated by the RAID management system 110. When viewed by the user or host application program, an application level virtual view can represent a single large storage capacity indicative of the available storage space on storage disk drives 114. The RAID management system 110 can dynamically alter the configuration of the RAID areas over the physical storage space.

As a result, the mapping of the RAID areas in a RAID-level virtual view onto the disks and the mapping of a front end virtual view to the RAID view are generally in a state of change. In one embodiment, the memory map store 122 maintains the current mapping information used by the RAID management system 110 to map the RAID areas onto the disk drives, as well as the information employed to map between the two virtual views. As the RAID management system 110 dynamically alters the RAID level mappings, it also updates the mapping information in the memory map store to reflect the alterations.

Different mechanisms described in this disclosure provide for reconfiguring of the disk drives in the mirrored disk volume 112 without taking the disk volume out of service. Therefore, any application programs that rely on data stored within the disk volume 112 can continue their operation as the disk volume is maintained online. This disclosure also describes how to determine the order to update various system tables, when to invoke specific actions and how to handle the different errors that might occur.

Figure 2:
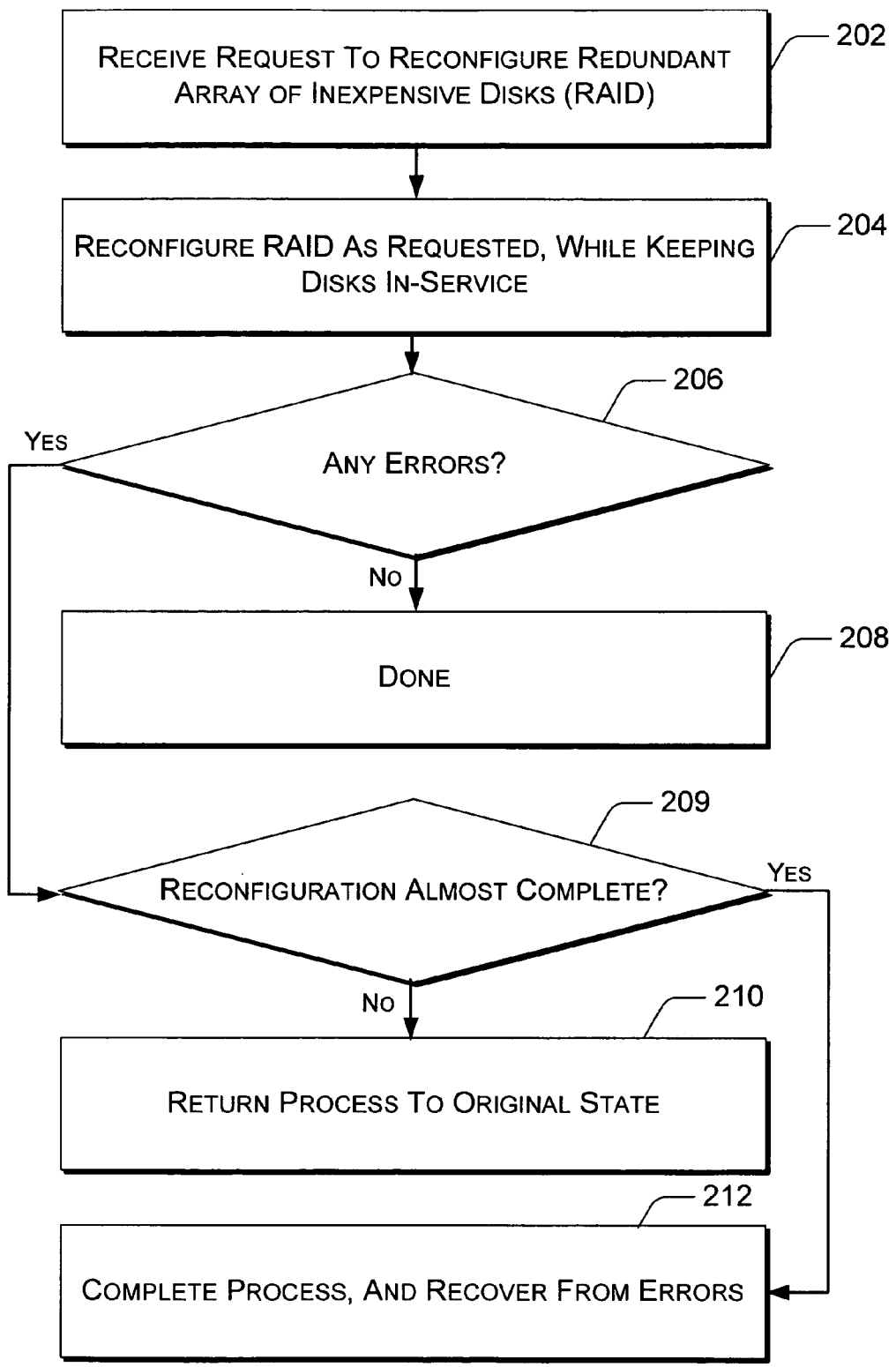
FIG. 2 is one embodiment of the invention showing a generalized RAID disk drive reconfiguring process.

FIG. 2 shows one embodiment of a RAID disk drive reconfiguring process 200 that may be performed by the ODR mechanism 100 within the RAID system 102 as described with respect to FIG. 1. The RAID disk drive configuration process 200 allows keeping RAID systems online during their reconfiguring as described in this disclosure. Different versions of the RAID disk drive reconfiguring process 200 are described with respect to FIGS. 3a, 3b, 4a, and 4b.

Within this disclosure, the term "process" is frequently used. It is intended that the term "process" apply to, and be interchangeable with, the "processor" that performs the "process".

The RAID disk drive reconfiguring process 200 includes a "receive request to reconfigure the RAID" operation 202. At block 204, the RAID disk drive reconfiguring process 200 continues reconfiguring the disk array 104, as described with respect to FIG. 1, while keeping the RAID disks in service in 204. This allows for reconfiguration the RAID system (one process at a time) while maintaining the RAID system online, which is important because it provides continual application support. There are a variety of techniques disclosed in this disclosure that provide for reconfiguring RAID disk drives online that follow the RAID disk drive reconfiguration process 200 as described in FIG. 2. Such reconfiguring can provide a mechanism to change whether the disk volume 112 of a primary disk drive is mirrored or unmirrored, and the identity of the primary disk drive and the mirror disk drive without taking the primary disk drive out-of-service. The RAID disk drive reconfiguring process 200 continues to decision 206 in which it is determined whether there are any errors in the reconfiguring process 200. If the answer to decision 206 is no, then the reconfiguring process 200 continues to a "done" operation 208 in which the process is finished.

If the answer to decision 206 is yes, then there might be some error in the reconfiguring process, and the RAID disk drive reconfiguring process 200 continues to decision 209 in which it is determined whether the reconfiguring process 200 is substantially complete. An aspect of determining whether the reconfiguring process 200 is substantially complete is that if an error is detected when the reconfiguring process is first starting up (and is not substantially complete such as would be the case if the error was in the first process of the process pair); it typically is easier and more reliable to return the ODR mechanism 100 to its original state prior to beginning the reconfiguring process.

By comparison, if the reconfiguring process has already accurately completed the first process of the process pair, and the error is in the second process of the process pair, then the reconfiguring process is considered to be substantially complete. The term "substantially complete" may be equated to the process pair concept as described within this disclosure. An error being detected in the first process which is being processed (as the second process is sustained in its original state) would likely relate to a reconfiguration process not being substantially complete. By comparison, the error being detected in the second process (after the first process has completed its processing and its completed state is being sustained) could be considered as an error as the reconfiguration process being substantially complete. If the reconfiguration process is substantially complete, then the reconfiguration process continues to 212 as described with respect to FIG. 2. The process-pair concept provides a mechanism by which the RAID disks can be reconfigured while they are maintained online.

In one embodiment, a number of factors can be used to determine whether to roll-back to the original state, or continue to the finished state. Whether to roll-back or continue may depend on two factors: 1) The type of error encountered 2) Where in the process the processor that is running the process is. In one embodiment, a processor halt occurs. Following a processor halt, the process considers a new or old configuration is being run, and cleans up the configuration of the process accordingly. If the processor is running one process (e.g., with a new configuration), then the processor completes what it can, which includes steps such as database update. If the processor is running another process (e.g., with the old configuration), then the processor performs reversal steps such as contained within reversing system tables.

If the processor encounters some other error (for example, failing to update a system table), then the decision becomes whether the process contains sufficient configuration state information to commit the configuration change. If the process does not contain sufficient configuration state information, then the process is backed out with the state being returned to its original state. By comparison, if the reconfiguring process 200 is substantially complete, then it is typically easier and more reliable for the ODR mechanism 100 to finish the reconfiguring process, and then correct the resulting errors produced by the reconfiguring process. By following this reconfiguring logic and FIG. 2, if the answer to the decision 209 is no, then the reconfiguring process 200 continues to a "Return Process to Original State" operation 210 in which the state of the ODR mechanism 100 is returned to its state prior to beginning the reconfiguring process. In one embodiment, the process can be returned to its original state by storing all of the original values of the configuration attributes separately from the processed values. In another embodiment, the original values can be obtained by following the inverse operations of the reconfiguring process 200. If the answer to decision 209 is yes, then the reconfiguring process 200 continues to a "Complete Process, and Recover from Errors" operation 212 in which the reconfiguring process is completed to provide a new state, and the new state is corrected as to the error detected in 206.

II. Example Disk Device Reconfiguration

Figure 3A:
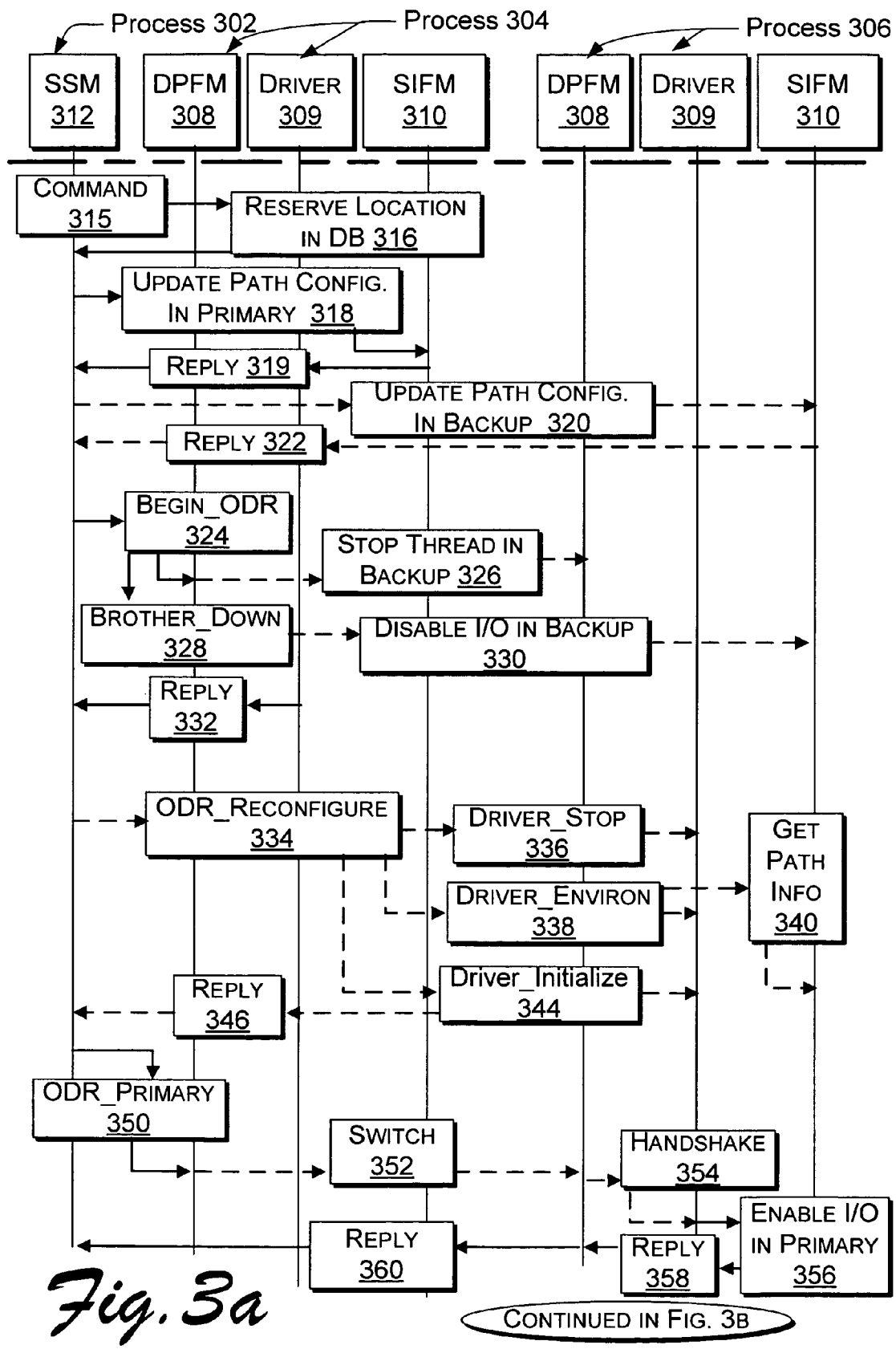
FIGS. 3a and 3b are a block diagram of one embodiment of the invention showing a RAID disk drive reconfiguring process as shown in FIG. 2 that can be configured either as an Add_Location function or a Swap_Location function.
Figure 3B:
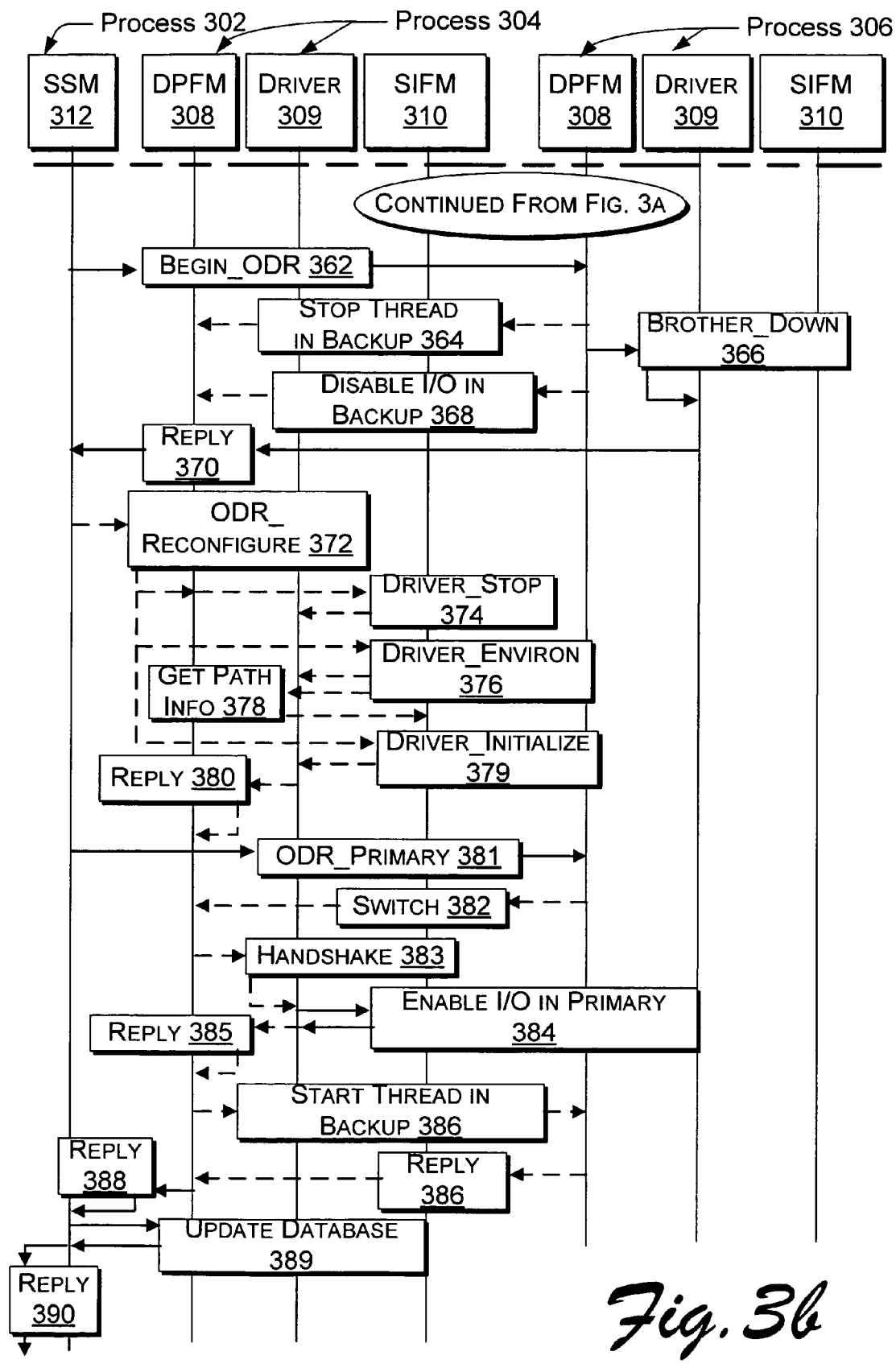
Figure 4A:
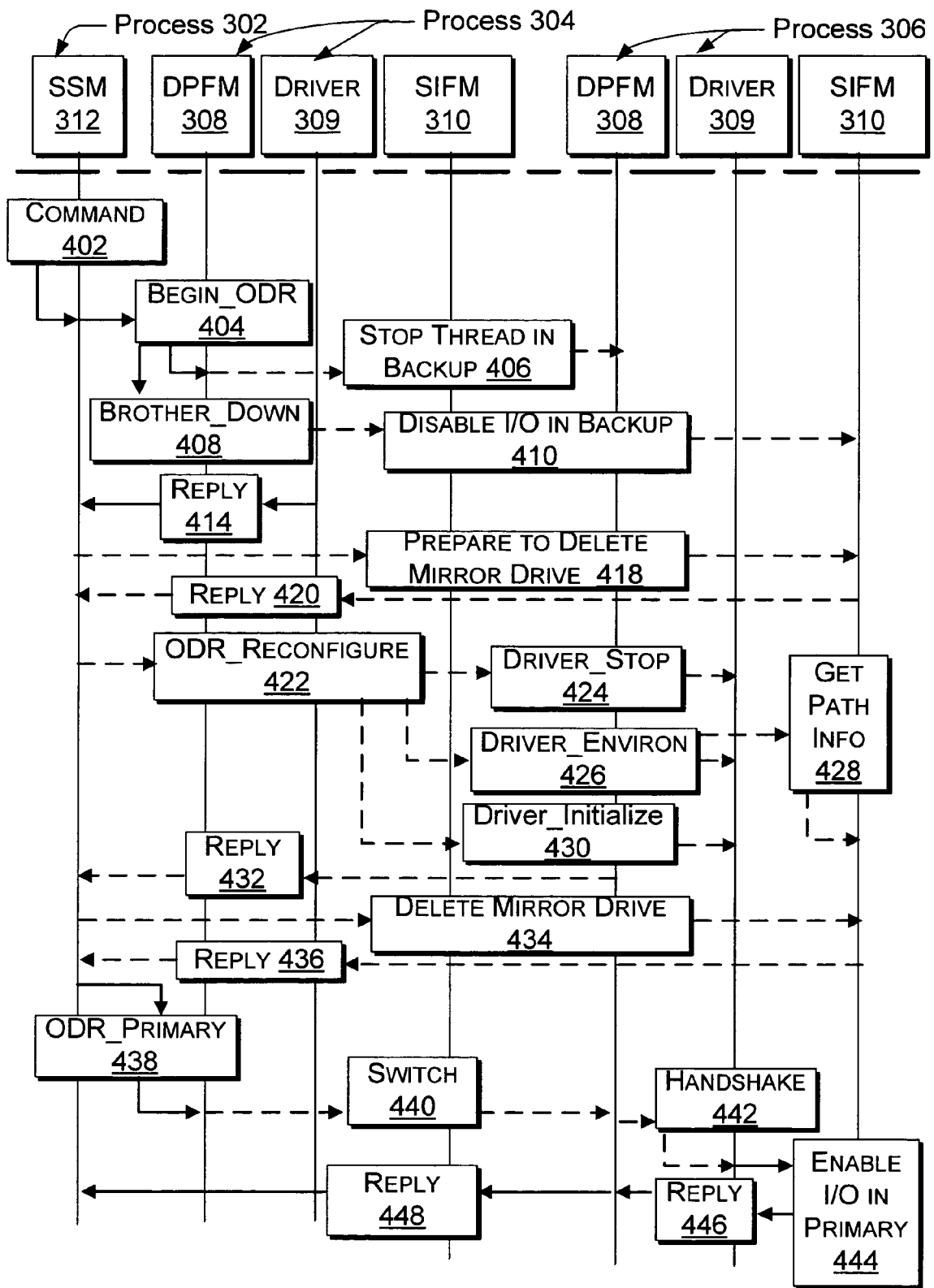
FIGS. 4a and 4b are a block diagram of one embodiment of the invention showing a Delete_Mirror function flow, which is a version of the RAID disk drive reconfiguring process as shown in FIG. 2.
Figure 4B:
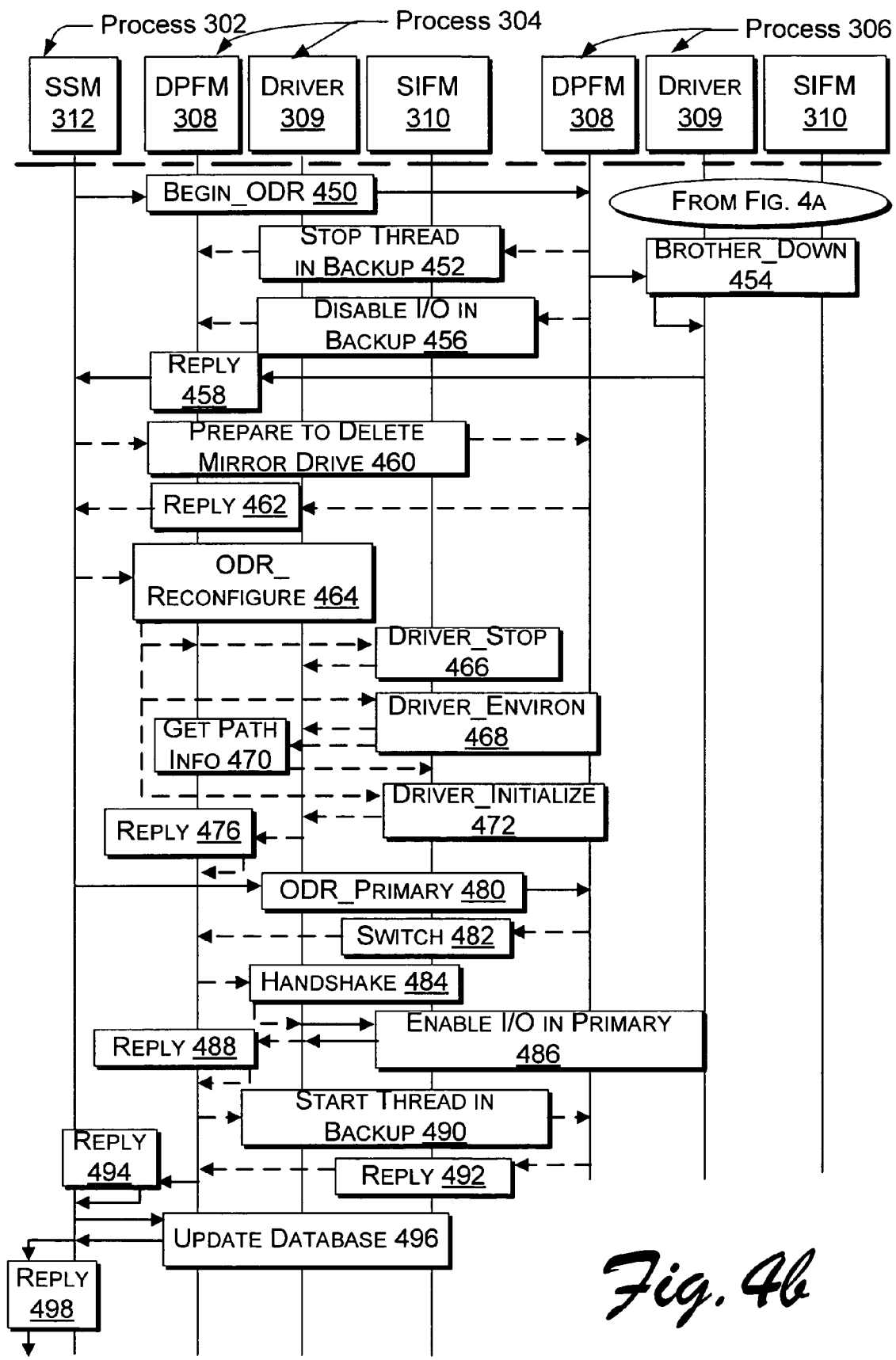

This disclosure now describes a number of embodiments of the RAID disk drive reconfiguring process 200 described with respect to FIGS. 2, 3a, 3b, 4a, and 4b that can operate based on the process pairs as described within this disclosure. One embodiment of the RAID disk drive reconfiguring process 200 that can alternatively add a mirror disk drive or switch between a mirror disk drive and a primary disk drive is described with respect to FIGS. 3a and 3b (FIG. 3b is a continuation of FIG. 3a). As such, the following description of adding a disk drive with respect to FIGS. 3a and 3b also applies to switching or swapping the roles of a mirror disk drive with a primary disk drive. One embodiment the RAID disk drive reconfiguring process 200 that acts to delete a mirror disk drive from an existing disk array 104 is described with respect to FIGS. 4a and 4b (FIG. 4b is a continuation of FIG. 4a).

In FIGS. 3a, 3b, 4a, and 4b, the ODR process 100 that is shown across the top of each respective figure includes a control process 302 and a pair of RAID processes 304 and 306 (each RAID process 304 and 306 contains a separate copy of the operating system and runs on a separate processor). The combination of processes 304 and 306 with their respective processors and operating system copies running (i.e., operating) together is referred to as a process pair. The control process 302 includes a storage subsystem manager 312 which controls the operation of the RAID processes 304, 306 while performing the RAID disk drive reconfiguring process 200.

Each one of the RAID processes 304, 306 includes a disk process file manager 308, a driver 309, and a SCSI interface monitor 310 (which is a low-level privileged system process responsible for maintenance of the in/memory I/O configuration tables on behalf of the Kernel). At any given instant in time, one of the RAID processes 304 or 306 controls both the primary disk drive (and the associated process) and the mirror disk drive (and the associated process). The particular one of the respective RAID processes 306 or 304 that controls the disk drives may be switched using a RAID disk drive reconfiguring process 200 as described herein. This disclosure provides one implementation in which the roles between the different processes are organized. In other embodiments of the operating systems, a different mechanism may be provided (for example, by combining the SSM and SIFM functions).

In FIGS. 3a, 3b, 4a, and 4b, the solid horizontal lines relate to operations, decisions, requests, and messages that relate to the primary role within the process pair, while the dotted horizontal lines relate to operations, decisions, requests, and messages that relate to backup roles.

The embodiment of the RAID disk drive reconfiguring process 200 as described with respect to FIGS. 3a and 3b includes a mirror adding process 314 (or as differentiated herein, a mirror swapping process). The mirror adding process 314 includes an "Operation Parsing" operation 315 that uses an ""Alter Disk", MirrorLocation" operation to add a mirror disk drive to an unmirrored disk volume. The "Operation Parsing" operation 315 is invoked, for example, when the user has typed a system configuration facility operation and the storage system configuration facility. The operation information is sent in a programmatic command buffer to the storage subsystem manager 312 within the control process 302.

In a "Reserve Location in Database" operation 316, the storage subsystem manager 312 writes a location reservation record for the target mirror into a database since a mirror disk drive is to be added to the disk volume 112. This location reservation record is the "DISK_Altkey_Record" record used by the storage subsystem manager 312 to find disk volumes by location. The purpose of this reservation is to ensure that another configuration request against the same location will fail—as soon as the location is reserved, the location is considered in use. In this implementation, the location record contains a modified version of the disk-volume name, which enables the system to remove orphaned reservation records in case of a crash in the midst of ODR processing. The "Reserve Location In Database" operation 316 is invoked after receiving the "Operation Parsing" operation 315 indicating with respect to FIGS. 3a and 3b an "Alter Disk" operation or a "Swap Disk" operation (both operations can use a similar process flow).

In the "Update Path Configuration in Primary" operation 318, the storage subsystem manager calls a function specifying an "Add-Mirror" call. This call can be used when the path configuration in the system tables should be updated in both processes 304 and 306 before the disk process is told to begin its "ODR processing using the ODR_Begin" operation. This call ensures that the disk process have up-to-date information in the system tables in case it has to switch to the backup process before the ODR action has been completed. A reply 319 responds to the "Update Path Configuration in Primary" operation 318.

In the "Update Path Configuration in Backup" operation 320, the storage subsystem manager 312 of the control process 302 calls an operation for documentation to specify which action to perform (i.e., "Add-Mirror" or "Swap Mirror" in FIGS. 3a and 3b). The "Update Path Configuration" operation 320 is invoked before calling the "ODR_Begin" operation. Reply 322 responds to the "Update Path Configuration" operation 320.

In the "ODR-Begin" operation 324, the storage subsystem manager 312 sends a message to the primary disk process, telling it to commence the RAID disk drive reconfiguring process 200 as described with respect to FIG. 2 within the ODR mechanism 100 as described with respect to FIG. 1. The "ODR-Begin" operation 324 causes the primary disk process to perform the following steps: a) stop a disk process thread in the backup process in 326; and b) call the "Driver_Brother_Down" operation in 328, which causes the Disk Driver 309 in the primary process 304 to break its link to the Disk Driver 309 in the backup process in 306 (and in effect sever the backup process with respect to the primary process). The disk process thread(s) as described within this disclosure can be either a light thread or a heavy-weight thread. One embodiment provides a heavy-weight thread which includes multiple processes to implement the process threads.

There are two inverse operations described within this disclosure, the "Driver_Brother_Down" operation that causes the link between the primary process and the backup process to be broken, and the "Driver_Brother_Up" operation that causes the link between the primary process and the backup process to be (re)established as described in this disclosure. This means that the Disk Driver 309 in the primary disk process 304 can not, for example, send checkpoints to the Disk Driver 309 in the backup disk process 306 thereby ensuring that configuration changes don't occur in a non-controlled manner. (If the link was not severed, then the configuration change would be copied as part of the checkpoint, which could cause, for example, I/O paths to be deleted during a pending I/O).

The "Disable I/O in Backup" operation 330 brings the volume down in the backup process. The "Begin_ODR" operation 324 is invoked prior to beginning the reconfiguring the SCSI Interface Monitor (SIFM) 310 using the "Disable I/O in Backup" operation 330. The "Driver_Brother_Down" operation 328 breaks the link between processors for the Driver ODR_State within the ODR mechanism. Replies 329 and 332 respond to the "Disable I/O in the Backup" operation 330.

In the "ODR_Reconfigure" operation 334, the storage subsystem manager tells the backup disk process to reconfigure its Disk Driver 309. The "ODR_Reconfigure" operation 334 causes the backup disk process to invoke the following operations: a) call the "Driver_Stop" operation 336, which causes the Disk Driver 309 to think that the disk process is going away thereby causing the Disk Driver to clean up configuration entries and data structure in the backup process; b) call the "Driver_Environment" operation 338, which causes the Disk Driver 309 in the backup process to retrieve the changed path information from the system tables via the SIFM 310 in the backup process 306 and create new data structures; and c) call the "Driver_Initialize" operation 344 which causes the Disk Driver 309 to go through setup processing.

Consider that the I/O remains disabled in the backup process at this point following 330 (the disk volume is still logically down in the backup process). Once the operations 336, 338, and 344 have been completed, the Disk Driver 309 in the backup disk process 306 is ready to use and make use of the new path information in 340. Call the "Driver_Initialize" operation 344 is invoked as part of the first pass through the ODR processing, and represents the first time the "ODR_Reconfigure" operation is invoked. The Reply 346 acts to respond to the "ODR_Reconfigure" operation 334.

In the "ODR Primary" operation 350, the storage subsystem manager 312 tells the primary disk process to perform a "Primary_Disk" action which causes the primary disk process to switch roles with the backup disk process in a "Switch" operation 352, followed by a "Handshake" operation 354. Following the "Switch" operation 352, the backup disk process now acts as the primary disk process, and the primary disk process acts as the backup disk process. During this processing, the disk process uses the path information to determine how to handle the special ownership-switch request. The "ODR Primary" operation 350 is invoked after the Disk Driver 309 in the backup process 306 has been reconfigured following the "Enable I/O in Primary" operation 356.

If the path information is different between the primary and backup disk processes, then the "ODR Primary" operation 350: a) starts the disk process thread in the new primary process; and b) stops the disk process thread in the new backup process; and c) calls the "Driver_Brother_Down" operation, which causes the Disk Driver 309 in the primary process to break its link to the Disk Driver 309 in the backup process in 368. This checking is used to ensure that the disks in the disk array 104 as shown in FIG. 1 contain redundant data. At this point, the new path configuration is in use in the primary disk process. The Disk Driver 309 in the primary disk process 304 is temporarily no longer in communication with the Disk Driver 309 in the backup disk process 306, which means that path reconfiguring is performed in the backup disk process.

If the path information is the same between the primary and backup disk processes 304, 306, then the ODR Primary Operator 350: a) start the disk process thread in the new primary process (there is no need to start the disk process thread in the backup process since it is already running from prior to the ownership switch); and b) calls the "Driver_Brother_Up" operation, which causes the Disk Driver 309 in the primary process to recreate its link to the Disk Driver 309 in the backup process. This means that Driver checkpointing is activated again. The configuration change is complete in the disk process. The Replies 358 and 360 are both responsive to the "ODR_Primary" operation 350.

In the "Begin_ODR" operation 362, the storage subsystem manager 312 sends a message to the primary disk process, telling it to (once again following 324) commence the RAID disk drive reconfiguring process 200. This "Begin_ODR" operation 362 causes the primary disk process to: a) stop the disk process' disk process thread in the backup process in 364; and b) call the "Driver_Brother_Down" operation in 366, which causes the Disk Driver 309 in the primary process to break its link to the Disk Driver 309 in the backup process in the "Disable I/O in Backup" operation 368. This means that the Disk Driver 309 in the primary disk process can not, for example, send checkpoints to the Disk Driver 309 in the backup disk process. The "Disable I/O in Backup" operation 368 results in the volume being down in the backup. The "Begin_ODR" operation 362 is invoked after changing the configuration of the SIFM 310. The Reply 370 is responsive to the "Begin_ODR" operation 362.

In the "ODR_Reconfigure" 372 the storage subsystem manager tells the primary disk process to reconfigure the Disk Driver 309. The "ODR_Reconfigure" request causes the backup disk process to: a) call the "Driver_Stop" operation 374 that causes the Disk Driver 309 to think that the disk process is going away thereby causing the Disk Driver 309 to clean up configuration entries and data structure in the backup process; b) call the "Driver_Environment" operation 376 that causes the Disk Driver 309 in the backup process to retrieve the changed path information from the SIFM 310 in the backup process and to create new data structures; and c) call the "Driver_Initialize" operation 379, which causes the Disk Driver 309 to go through setup processing. The I/O remains disabled in the backup process at this point; the disk volume is still logically reduced in the backup process.

Once the operations 374, 376, and 379 have been completed, the Disk Driver 309 in the backup disk process is ready to use and make use of the new path information in 378. Invoked as part of the second pass through the ODR processing. This is the second time Reconfigure Driver is invoked. The Reply 380 is responsive to the "ODR_Reconfigure" operation 372.

In the "ODR Primary" operation 381, the storage subsystem manager tells the primary disk process to perform the Primary_Disk action. The "ODR Primary" operation 381 causes the primary disk process to "Switch" roles with the backup disk process in 382, after which 383 is a "Handshake" operation The new backup disk process, which was switched form the original primary disk process in 352, is therefore switched again to the current primary disk process after 382. Additionally, the new primary disk process, which was switched form the original backup disk process in 352, is therefore switched again to the current backup disk process after 382. During this processing, the Disk Process uses the path information to determine how to handle the special ownership-switch request. The "ODR Primary" operation 381 is invoked after the Disk Driver 309 in the backup disk process has been reconfigured following the "Enable I/O in Primary" operation 384.

If the path information of the primary disk drive differs from that of the backup disk drive, then a) start the disk process thread in the new primary process; b) stop the disk process thread in the new backup process; and c) call the "Driver_Brother_Down" operation to break the link between the primary process and the backup process. At this point, the new path configuration is in use in the primary disk process. The Disk Driver 309 in the primary disk process is temporarily no longer in communication with the Disk Driver 309 in the backup disk process, which means that path reconfiguring can be performed in the backup disk process.

If the path information is the same between the primary and backup disk processes, then start the disk process thread in the new primary process. There is no need to start the disk process thread in the backup process since it is already running from prior to the ownership switch. Call the "Driver_Brother_Up" operation, which causes the Disk Driver 309 in the primary process to recreate its link to the Disk Driver 309 in the backup process. The configuration change is complete in the disk process and is in active use. The replies 385, 387, and 388 are responsive to the ODR-Primary operation 381 (or other associated operations).

In the Update Database operation 389, the storage subsystem manager 312 updates the system-configuration database depending on what type of ODR processing was performed. To add a disk as described with respect to FIGS. 3a using an "Alter Disk-Mirror Location" operation, the location of the mirror disk drive is added to the driver record and the volume-name field is changed which in one embodiment includes changing the record to contain the real name of the disk volume. To swap the disk drives in the primary disk drive and the secondary disk drive as described with respect to FIGS. 3a and 3b, the "Swap_Mirror" operation is used to update the location information in the driver record. The Reply 390 may be considered as in response to the "Operation Parsing" operation 315, and confirms that the RAID disk drive reconfiguring process 200 has successfully reconfigured the ODR process.

The control process 302 then transmits an update path configuration in backup request 320 to the RAID process 306 (that can be configured in FIGS. 3a and 3b as a mirroring process). The mirroring RAID process 306 responds with a reply 322.

One embodiment the RAID disk drive reconfiguring process 200 that acts to delete a mirror disk drive as a mirror is described with respect to FIGS. 4a and 4b (the logic of FIG. 4a is continued in FIG. 4b). With the "Operation Parsing" operation 402, the user has, for example, typed a system configuration facility operation and the Storage system configuration facility Product Module has sent the operation information in a programmatic command buffer to the storage subsystem manager.

In the "Begin_ODR" operation 404, the storage subsystem manager send a message to the primary disk process, telling it to commence the Online Disk Remirroring processing. This message causes the primary disk process to perform the following steps: a) perform the "stop the disk process disk process thread in the backup process" operation 406, and b) call the "Driver_Brother_Down" operation in 408, which causes the Disk Driver 309 in the primary process to break its link to the Disk Driver 309 in the backup process in 410. This means that the Disk Driver 309 in the primary disk process can not, for example, send checkpoints to the Disk Driver 309 in the backup disk process. The "Begin_ODR" operation is invoked before changing the SCSI Interface Monitor configuration. Reply 414 is responsive to the "Begin_ODR" operation 404.

In the "Prepare To Delete Mirror In SCSI Interface Monitor (SIFM)" operation 418, the storage subsystem manager calls the "Predelete_Mirror" operation, which tells the SIFM that the mirror disk drive is about to be deleted. This request causes the SIFM to present the new path information from the Disk Driver 309 when it performs a path fetch but keeps a copy of the old path information in memory for fallback purposes. The "Prepare to Delete Mirror in SIFM" operation 418 is invoked before calling first "ODR_Primary" operation and before reconfiguring the Disk Driver 309 in the backup disk process. The reply 420 is responsive to the "Prepare to Delete Mirror in SIFM" operation 418.

The "ODR_Reconfigure" operation 422 acts to the storage subsystem manager tells the backup disk process to reconfigure the Disk Driver 309. The "Disk Process_Reconfigure Request" causes the backup disk process to invoke the following three steps: a) call the "Driver_Stop" operation 424, which causes the Disk Driver 309 to think that the disk process is going away thereby causing the Disk Driver 309 to clean up configuration entries and data structure in the backup process; b) call the "Driver_Environment" operation 426, which causes the Disk Driver 309 in the backup process to retrieve the changed path information from the SIFM in the backup process in 428 and to create new data structures; and c) call the "Driver_Initialize" operation 430, which causes the Disk Driver 309 to go through setup processing. The I/O remains disabled in the backup process at this point—the disk volume is still logically down in the backup process.

Once these steps have been completed, the Disk Driver 309 in the backup disk process is ready to make use of the new path information from 428. The "ODR_Reconfigure" operation 422 is invoked as part of the first pass through the ODR processing. This is the first time Reconfigure Driver is invoked. Reply 432 is responsive to the "ODR_Reconfigure" operation 422.

In the "Prepare To Delete Mirror In SCSI Interface Monitor (SIFM)" operation 434, the storage subsystem manager tells the SIFM that the mirror disk drive is about to be deleted. This request causes the SIFM to present the new path information from the Disk Driver 309 when it performs a path fetch but keeps a copy of the old path information in memory for fallback purposes. The "Prepare To Delete Mirror In SIFM" operation 434 is invoked before calling first "ODR_Primary" and before reconfiguring the Disk Driver 309 in the backup disk process. The reply 436 is responsive to the "Prepare To Delete Mirror in SCSI Interface Monitor (SIFM)" operation 434.

In the "ODR_Primary" operation 438, the storage subsystem manager tells the primary disk process to perform the Primary_Disk action which causes the primary disk process to switch roles with the backup disk process in 440. Following the "Switch" operation 440, the backup disk process is now the primary disk process and vice versa. During this processing, the Disk Process uses the path information to determine how to handle the special ownership-switch request using the "Handshake" operation 442 and the "Enable I/O in Primary" operation 444. The Reply 448 is responsive to the "ODR_Primary" operation 438.

If following the "ODR_Primary" operation 438, the path information is different between the primary and backup disk processes, then: a) start the disk process thread in the new primary process; b) stop the disk process thread in the new backup process; and c) call the "Driver_Brother_Down" operation. At this point: a) the new path configuration is in use in the primary disk process; and b) the Disk Driver 309 in the primary disk process is no longer in communication with the Disk Driver 309 in the backup disk process, which means that path reconfiguring can be performed in the backup disk process.

If the path information is the same between the primary and backup disk processes, then: a) start the disk process thread in the new primary process. (There is no need to start the disk process thread in the backup process since it is already running from prior to the ownership switch.); and b) call the "Driver_Brother_Up" operation, which causes the Disk Driver 309 in the primary process to recreate its link to the Disk Driver 309 in the backup process. This means that Driver checkpointing is activated again. The "ODR_Primary" operation 438 can be invoked after the Disk Driver 309 in the backup disk process has been reconfigured.

In the "Begin_ODR" operation 450, the storage subsystem manager sends a message to the primary disk process, telling it to commence the Online Disk Remirroring processing. This "Begin_ODR" operation 450 causes the primary disk process to perform the following steps: a) stop the disk process disk process thread in the backup process in 452, and b) call the "Driver_Brother_Down" operation in 454, which causes the Disk Driver 309 in the primary process to break its link to the Disk Driver 309 in the backup process in 456. This means that the Disk Driver 309 in the primary disk process can not, for example, send checkpoints to the Disk Driver 309 in the backup disk process—however, the Disk File Manager checkpointing remains active. The "Begin_ODR" operation is invoked before changing the SCSI Interface Monitor configuration. The reply 458 is responsive to the "Begin_ODR" operation 450. The "Begin_ODR" operation is invoked after changing the SCSI Interface Monitor configuration.

In the "Prepare To Delete Mirror In SCSI Interface Monitor (SIFM)" operation 460, the storage subsystem manager specifies to the SIFM that the mirror disk drive is about to be deleted. This request causes the SIFM to present the new path information from the Disk Driver 309 when it performs a path fetch but keeps a copy of the old path information in memory for fallback purposes. The "Prepare To Delete Mirror In SIFM" operation 460 is invoked before calling first "ODR_Primary" operations and before reconfiguring the Disk Driver 309 in the backup disk process. The reply 462 is responsive to the "Prepare To Delete Mirror In SIFM" operation 460. The "Prepare To Delete Mirror In SIFM" operation 460 is invoked after calling first "ODR_Primary" operation and before reconfiguring the Disk Driver 309 in the backup disk process.

In the "ODR_Reconfigure" operation 464, the storage subsystem manager tells the backup disk process to reconfigure the Disk Driver 309. The "ODR_Reconfigure" request causes the backup disk process to invoke the following three steps: a) call the "Driver_Stop" operation 466, which causes the Disk Driver 309 to think that the disk process is going away thereby causing the Disk Driver 309 to clean up configuration entries and data structure in the backup process; b) call the "Driver_Environment" operation 468, which causes the Disk Driver 309 in the backup process to retrieve the changed path information from the SIFM in the backup process in 470 and to create new data structures; and call the "Driver_Initialize" operation 472 which causes the Disk Driver 309 to go through setup processing. The I/O remains disabled in the backup process at this point, the disk volume is still logically down in the backup process. The "ODR_Reconfigure" operation 464 is invoked as part of the second pass through the ODR processing. (This is the second time Reconfigure Driver is invoked). The reply 476 is responsive to the "ODR_Reconfigure" operation 464.

In the "ODR_Primary" operation 480, the storage subsystem manager tells the primary disk process to perform the Primary_Disk action which causes the primary disk process to "Switch" roles with the backup disk process in 482. Following the "Switch" operation 482, the backup disk process is now the primary disk process and vice versa.

During this processing, the Disk Process uses the path information to determine how to handle the special ownership-switch request using the "Handshake" operation 484 and the "Enable I/O in Primary" operation 486. The Reply 488 is responsive to the "ODR_Primary" operation 480.

If following the "ODR_Primary" operation 480, the path information is different between the primary and backup disk processes, then: a) start the disk process thread in the new primary process 490; b) stop the disk process thread in the new backup process; and c) call the "Driver_Brother_Up" operation. At this point: a) the new path configuration is in use in the primary disk process; and b) the Disk Driver 309 in the primary disk process is no longer in communication with the Disk Driver 309 in the backup disk process, which means that path reconfiguring can be performed in the backup disk process. If the path information is the same between the primary and backup disk processes, then: a) start the disk process thread in the new primary process. (There is no need to start the disk process thread in the backup process since it is already running from prior to the ownership switch); and b) call the "Driver_Brother_Down" operation which causes the Disk Driver 309 in the primary process to recreate its link to the Disk Driver 309 in the backup process. This means that Driver checkpointing is activated again. The "ODR_Primary" operation 480 can be invoked after the Disk Driver 309 in the backup disk process has been reconfigured. The replies 492 and 494 are responsive to the "ODR_Primary" operation 480.

In the Update Configuration Database 496, the storage subsystem manager 312 updates the system-configuration database depending on what type of ODR processing was performed. The mirror-disk path information is removed from the driver record. The storage subsystem manager then replies to the user, indicating success. The reply 498 is responsive to the Update Configuration Database 496.

III. Reconfiguring Operations

The RAID disk drive reconfiguring process 200 can be implemented as a process pair that runs in different processes. In one embodiment, the path configuration associated with the RAID disk drive reconfiguring process 200 is kept in system tables replicated to the processes in which the disk process pairs are running. In one embodiment, the configuration information associated with the RAID disk drive reconfiguring process 200 is maintained in separate system database tables that are managed by a separate program. In another embodiment it is not necessary to maintain the configuration information that are associated with the RAID disk drive reconfiguring process 200 in separate system database tables, but instead the information is maintained within a single system table as a process pair. It is not necessary to have a separate process managing the overall procedure from the process that is running the RAID disk drive reconfiguring process 200 (even though multiple distinct managing and running processes are useful) since a single procedure is handled within the process pair itself.

In one embodiment of the ODR mechanism 100 of the present disclosure, reconfiguring might be not allowed when the disk volume 112 is in a transitional state such as during a disk revive. If, for any reason, the user has an overriding reason to move the disk drive when in a transitional state, then the user can simply temporarily halt the revive or other transitional activity, after which the disk drive is moved. The disk revive is restarted by the operator once the disk drive has been moved.

Many RAID disk drive reconfiguring processes 200 use the ODR mechanism 100 to move at least one disk drive. For example, swapping a primary disk drive with a mirror disk drive as described with respect to FIGS. 3a and 3b involves moving the primary disk drive to the location of the mirror disk drive, and vice versa. To move a mirror disk drive, the procedure outlined in TABLE 1 is followed.

TABLE 1

To move a mirror disk drive

1) Power off the mirror disk drive (e.g., using the "Control Disk, Power_Off" operation) if the same disk drive is used.
2) Delete the mirror disk drive using the "Delete Disk" operation.
3) Move the mirror disk drive physically if the same physical disk drive is used. In one embodiment, insert the mirror disk drive in its new location acts to power it on automatically.
4) Add the new mirror disk drive using the "Alter Disk, Mirror Location" operation.
5) Start a disk revive. Once complete, the two disks contain identical data and are back to a fault-tolerant state.

During one embodiment of moving the primary disk drive that is associated with the moving the mirror disk drive as shown in TABLE 1, the operator can undergo the procedure described in TABLE 2.

TABLE 2

To move a primary disk drive

1) Swap roles between the primary disk drive and the mirror disk drive using the "Alter Disk, Swap_Mirror" operation.
2) If the same disk drive is to be used: power off the disk drive using the "Control Disk, Power_Off" operation.
3) Delete the mirror disk drive using the "Delete Disk" operation.
4) Physically move the disk drive if the same disk drive is to be used. Inserting the disk drive in its new location can power it on automatically.
5) Add the new mirror disk drive using the "Alter Disk, Mirror_Location " operation.
6) Swap roles between the primary disk drive and mirror disk drive using the "Alter Disk, Swap_Mirror" operation.
7) Start a disk revive. Once complete, the two disks contain identical data and are back to a fault-tolerant state.

There are a number of operations that are described within this disclosure that are used to reconfigure disk drives and thereby provide the RAID disk drive reconfiguring process 200 functionality to the ODR mechanism 100. These operations are intended to be illustrative and not limiting.

A certain number of embodiments of the ODR mechanism 100 provide the capability to power on or off a disk drive from the system configuration facility. The "Power_Off" operation and the "Power_On" operation provides for the capability to perform a consistency check between the different storage components in regards to configuration information. The "Control Disk" operation relates to Power {OFF|ON}, which provide "Power_Off" and "Power_On" operation attributes. The Power {OFF|ON} operation attributes are used to power off or on a disk drive that is in a Stopped state.

In certain embodiments, the "Alter Disk" operation can include a "Swap_Mirror" operation and a "Mirror_Location" operation. The "Swap_Mirror" operation attribute is used to switch roles between the primary disk drive and mirror disk drives of a mirror disk volume 112. The "Mirror_Location" operation attribute is used to add a disk drive to a non-mirrored disk volume 112 thereby creating a mirrored disk volume. The "Mirror_Location" operation attribute is allowed even if the disk volume 112 is in a Started state.

A "Delete Disk" operation acts to delete a mirror disk drive (even if primary disk drive is in a Started state). To use the "Delete Disk" operation, the mirror disk drive transitions to a Stopped state.

In one embodiment of the "Status Disk" operation, a Consistency operation attribute is added that is used to validate that the configuration information is equal in the system-configuration database, the disk process, and the SCSI Interface Monitor system tables.

Both the primary disk process and the backup disk process can do I/O to both the primary disk drive and the mirror disk drives. The backup disk process is configured to take over from the primary disk process at any point during processing. To change the path configuration of a disk drive, the processes as shown in TABLE 3 are taken.

TABLE 3

To change the path of a disk drive

1) Input/Output (I/O) in the backup disk process is disabled
2) The path configuration in the backup process is changed
3) The backup disk process performs an initialization of the disk I/O library, which obtains the new path configuration from the system library
4) An ownership switch is performed in which the I/O in the new backup disk process is disabled and the I/O in the new primary disk process is activated. This switch activates the changed configuration
5) Repeat this process for any other process, thereby completing change in both processes To change the mirror disk drive-related configuration of a disk volume 112, the user can first put the disk volume into a stopped state using the "Stop Disk" operation. The "Stop Disk" operation causes the ODR mechanism to be inaccessible to user processes. The stopped state is used for mirror disk drive-related configuration changes to be accepted. If the user does not put the disk volume 112 into a stopped summary state, then an error is generated. If the user wishes to delete the mirror disk drive of a mirror disk volume, the system configuration facility "Delete Disk" operation is used.

If the user wants to add a mirror disk drive to an unmirrored disk volume 112, the system configuration facility "Alter Disk" operation is used, specifying the location of the mirror disk drive. For internal disks, the storage subsystem manager can derive that the mirror-backup path is the same as the mirror path.

If the user wants to move the primary disk drive, the disk volume 112 can first be deleted from the system configuration using the system configuration facility "Delete Disk" operation and then be added back to the system configuration using the system configuration facility Add Disk operation.

If the user wants to switch the roles between the primary disk drive and the mirror disk drive of the disk volume 112, the disk volume can first be deleted from the system configuration using the system configuration facility "Delete Disk" operation and then be added back to the system configuration using the system configuration facility Add Disk operation.

Once the configuration change is complete, the user places the disk volume 112 in a started summary state using the system configuration facility "Start Disk" operation. If a mirror disk drive has been added to the disk volume 112, the user is asked whether a disk revive should be started using the "Start Disk" operation.

If a mirror disk drive has been added to the disk volume 112 but there is no physical disk drive present in the system, then a "Start Disk" warning is generated. When the disk drive is inserted, the disk revive is started automatically if the "Autorevive" setting is set to ON and the disk volume 112 consists of internal disks. If either of these two conditions is false, then the operator can issue a "Start Disk" operation to cause the disk revive to be started. Certain embodiments of the present disclosure provide for certain automatic capabilities, in which automatic action is provided using, e.g., disk inserts.

One embodiment of the storage subsystem manager provides processing that can provide for non stop process management, multitasking, and allowing blocking calls to be processed in a standalone environment. Therefore, the storage subsystem manager itself is focused on processing different events, such as programmatic command buffers operations and different system events such as process reload.

IV. "Alter Disk" Processing

Modifying one, or several of, the disk(s) 114 of the disk array as described with respect to FIG. 1 is performed using the "Alter Disk" command. When receiving a programmatic command buffer containing an object-type token (e.g., with the value of Obj_Disk and an operation-type token with the value of CMD_ALTER), the storage subsystem manager can follow the process flow shown in TABLE 4 to alter the data contained on one or more of the disks.

TABLE 4

"Alter Disk" processing flow

1. Check whether a path token is provided. If so, the value is validated. In this case, the value should be VAL-DEVICEPATH-NONE.
2. Extract the alter-disk token map.
3. Extract and validate the following tokens, if they are present: TKN-ALTNAME, TKN-INCONSISTENCY, TKN-LABEL, TKN-LIKE, TKN-VOLNAME, and TKN_WRITEVERIFY.
4. Check whether the forced token (TKN-CMD-POWER) is provided. If so, the value is validated.
5. Push down an object-info request to a storage subsystem manager, which obtains the status of the disk volume. This is standard processing for all operations and is therefore not described in further detail in this document.
6. Check whether there was an error obtaining the status of the disk volume. If so, an error is returned. If not, processing is continued.
7. Check whether the object name represents a real disk. If not, an error is returned.
8. Check whether there's a path configured for the disk volume. If not, an error is returned.
9. Check whether the operation attributes are correctly provided. This checking includes things such as whether the attribute is altered while the disk volume is in a started state.

In the case described with respect to TABLE 4, the mirror disk drive-location attributes are not changed while the disk volume 112 is in a started state. Furthermore, the only path attribute that is specified is VAL_DEVICEPATH_NONE. Once all the attributes have been validated, the storage subsystem manager generates an alter-audit Event Management System event and passes the processing to the "Phys add_alter_" operation in the storage subsystem manager. This is done since much of the processing used to process the "Alter Disk" operation uses the invocation of blocking function calls the "Phys_add_alter_" operation that performs those actions shown in TABLE 5.

TABLE 5

Phys_add_alter_disk processing flow

1. Locks the system-configuration database, reads the current configuration records, and loads local data structures (including processing the LIKE operation attribute) depending on what information was passed in the alter-disk command buffer. During this processing, the Phys_copy_user_to_new function records the type attribute that has been changed; that is, whether an offline attribute, an online attribute, a revive attribute etc has been changed.
2. Ensures that the provided paths in the configuration are compatible. (For example, device ID and LUN are correct.) If not, an error is returned.
3. Checks that the paths-related, process-related, and device-specific (for example, cache settings and revive settings) are valid. If not, an error is returned.
4. Performs device-related checks such as ensuring that the specified processes are available in the adapter's access list and there are not too many processes trying to access an Icepack. If any of these checks fail, an error is returned.
5. Checks whether the disk process is stopped. (After several branches on configuration changes that do no apply to this discussion, for example, changes related to other functions provided by the disk process). This is determined using the flags obtained from the "Phys_copy_user_to_new" operation; that is, if one of the attribute specified has the disk process offline. Since a location-related setting is being altered, the disk process should be stopped.
6. Locks the system-configuration database (in case it wasn't locked earlier - applies to, for example, the Add Disk operation) after which the old configuration is deleted from and the new configuration is inserted into the system-configuration database.
7. Refreshes the object-info data structure that is returned to the storage subsystem manager.
8. Returns the outcome of the operation. If there were warnings or errors during the processing, they can be provided in the reply message to the storage subsystem manager.
    a) Once the processing in the storage subsystem manager is completed, it evaluates the result of that processing. If an error occurred, a programmatic command buffer is built indicating where the error occurred. If no error was returned, a programmatic command buffer indicating success is built.
    b) The storage subsystem manager then replies to the programmatic command messages, using the programmatic command buffer that describes the outcome of the operation.

When receiving a SPI buffer containing an object-type token with the value of Obj_Disk and a operation-type token with the value of CMD_Delete, the storage subsystem manager does the following by checking whether: a) the forced token is provided, if so the value is validated; b) a path token is provided, if so the value is validated; c) the pool token is provided, if so the value is validated.

One embodiment of the standard processing that is applied for all operations within this disclosure is shown in TABLE 6.

TABLE 6

Standard operation processing a) Check whether there is an error obtaining the status of the disk volume. If so, an error is returned. If not, processing is continued.
b) Check whether the operation attributes are correctly provided. This checking includes, e.g., whether the specified path is indeed configured, that the path value is valid, and that the path is in a state that allows it to be deleted.
c) If all these checks are passed, an event is generated that the "Delete Disk" operation has been issued after which the storage subsystem manager passes the processing to the "Delete Disk" operation in the storage subsystem manager. This is done since much of the processing used to process the "Delete Disk "operation invokes of blocking function calls.

TABLE 6-continued

Standard operation processing d) The "Delete Disk" operation first checks whether the disk belongs to the transactional-processing subsystem or is a target for a virtual disk (as part of a storage pool). If the disk belongs to the transactional-processing subsystem, an error is returned. If it belongs to a storage pool, the "Delete Disk" operation checks whether only the mirror disk drive is to be deleted.
e) The "Delete Disk" operation then checks whether the disk process is running. If so, it's stopped.
f) The system-configuration database is locked and the configuration records for the disk volume and associated adapter records are read. If an error occurs, it is returned.
g) The path token is checked. If it contains a value of VAL_DEVICEPATH_NONE, then all disk configuration records are deleted, including the name of the disk process from the Destination Control Table (DCT).
h) Otherwise, the mirror disk drive only is to be deleted, causing the "Delete Disk" operation to invoke the "Disk_Delete_Path" operation.
i) The "Disk_Delete_Path" operation deletes the DISK_Altkey_Record record.
j) The "Disk_Delete_Path" operation updates the DISK_SCSI_Driver_Record record indicating that there's no longer a mirror disk drive configured for the disk volume.
k) The result of the "Disk_Delete_Path" operation is returned to the storage subsystem manager.
l) Once the processing in the storage subsystem manager completes, the storage subsystem manager evaluates the result of that processing. If an error occurred, a programmatic command buffer is built indicating where the error occurred. If no error was returned, a programmatic command buffer indicating success is built.
m) The storage subsystem manager then replies to the SPI messages, using the v buffer that describes the outcome of the operation.

Certain embodiments of the storage subsystem manager supports automated actions in response to disk-insertion events, which are currently limited to internal disk drives. There are a number of illustrative settings that can control automation as described with respect to TABLE 7.

TABLE 7

Automation Settings a) The "Autoconfigure" operation specifies whether the system can perform automatic configuration of non-configured storage devices when they are discovered in the system.
b) The "Autolabel" operation controls whether an unlabeled disk is labeled when configured. "Autolabel" applies only if the "Autoconfigure" operation is activated.
c) "Autorevive" controls whether a disk revive is started automatically when a disk drive is inserted.
d) The "Autostart" operation controls whether the disk process is started automatically when a disk drive is inserted. The "Autostart" operation applies only if the disk drive is already configured or if the "Autoconfigure" select is set to ON.

There are several techniques to control whether the automated actions take place. A prescribed operation can turn off certain settings. Alternatively, each disk-volume configuration record contains the above settings, thereby allowing the operator to turn the automatic actions on or off on a per-disk-volume level. In yet another embodiment, an object controls the default settings for all attributes when a disk volume 112 is added. These automated actions can also be invoked during system startup as part of discovery processing.

In one embodiment, the storage subsystem manager code verifies the operation buffer. Additionally, the buffer is forwarded to one of multiple processes in the storage subsystem manager. This code practice causes a problem for the Online Disk Remirroring (ODR) since the ODR involves many steps to execute the operation, which can cause database corruption if a process outage or a software defect causes a storage subsystem manager process to stop.

The remedy for this situation is that the mirror-related portion of the processing is moved, and the use of the storage subsystem manager process is limited to deal with calls to specific blocking functions only. Thus, the programming paradigm for the "Alter Disk" operation is as shown in TABLE 8.

TABLE 8

"Alter Disk" programming paradigm a) The storage subsystem manager invokes a pushdown operation (invokes a storage subsystem helper process to do blocked processing) to obtain state information for the target disk volume.
b) If the disk volume is in a Stopped summary state, then the storage subsystem manager invokes a pushdown operation that handles all "Alter Disk" attributes.
c) If the disk volume is in Started summary state, then the storage subsystem manager determines whether there are any mirror-related attributes in the operation buffer.
d) If not, then the storage subsystem manager invokes a pushdown operation that handles all "Alter Disk" attributes.
e) If so, then the storage subsystem manager invokes a pushdown operation that handles all "Alter Disk" attributes except the mirror-related attributes.
f) Once these attributes have been processed, the storage subsystem manager invokes the Online Disk Remirroring processing described later in this document.

Whether to process the mirror-related attributes first or last is a matter of design preference. Given that calls to blocking functions is done by the storage subsystem helper processes, it's impossible for the storage subsystem manager itself to know whether a system-configuration database request was performed if the storage subsystem manager fails before the result of the request is returned. A server process should handle duplicate requests using the opener table; that is, it should keep track of the n latest requests on a per-opener level. However, given that the Application Programming Interface (API) of the Configuration Services is implemented as a connection-less API, no opener-table processing has to be done.

Therefore, the process can perform a pre-check before commencing the mirror disk drive reconfiguring, to ensure that there are no records for the target disk drive location. The new mirror disk drive is addressed by location in the system configuration facility "Alter Disk" operation. The process can ignore any record-does-not-exist errors when deleting records and any record-already-exists errors when doing inserts.

To block other operations, there's a race condition that can occur when processing the system configuration facility "Alter Disk" operation, especially when mirroring an unmirrored disk or when changing disk drives in a mirrored disk volume 112: another operation can also use the free location. To address this race condition, the storage subsystem manager can pre-configure the free location as soon as the operation buffer has been validated, thus prohibiting other operations from making use of the location.

This pre-configured alternate-key record is treated as: a) if the remirroring operation succeeds: the pre-configured alt-key record is made a permanent configuration record; b) if the remirroring operation fails: the pre-configured alt-key record is deleted as well as if there's a system failure in the midst of processing the remirroring operation.

Another concern in this implementation is that operations such as the Primary_Disk and the Info_Disk and Label operations should be blocked while the configuration change is pending. This should be addressed by ensuring that the task table is scanned for other tasks manipulating the object. The storage subsystem manager is capable of checking whether a task for the specific object exists thereby allowing the storage subsystem manager to reject another request to do work for that task.

Certain disk drives should not be configured automatically within the ODR mechanism 100 since they are intended to be used as part of a pool of spare disk drives. This pool of spare disk drives can allow the user to configure the system to automatically replace a failed disk drive with one of the spare disk drives by performing an automated ODR mechanism that starts a disk revive. This feature is known as "Disk Sparing". The system configuration facility POOL object is a collection of software resources as shown in TABLE 9.

TABLE 9

Pool Operation Set

Add_Pool - defines that the Disk-Sparing feature should be enabled. (Without a defined pool, it is not enabled.)
Alter_Pool - adds disk drive locations to the disk drive pool
Delete_Pool - deletes one to many disk drive locations from the disk drive pool. All locations are deleted if specified.
Delete_Pool - disables the Disk-Sparing feature. The operation is used only if there are no locations specified for the disk drive pool.
Info_Pool - shows the disk drive locations that are part of the disk drive pool.

Providing the disk drive pool allows handling of both automatic configuration and automated disk sparing. If the location is in the disk drive pool, then the disk drive in that location can not be configured automatically.

The user interface can modify the behavior of the system configuration facility "Alter Disk" and the "Delete Disk" operations as a result of the ODR mechanism. The "Control Disk" operation is enhanced to allow the operator to power disk drives on or off. A Consistency option is added to the Status Disk operation to allow the operator to display whether the configuration information is equal between the system-configuration database, the two SCSI Interface Monitor processes, and the two disk processes that make up the disk process pair.

Mirroring-related disk drive configuration changes are made online; that is, while the disk volume 112 is in a Started state. The reconfiguring action is not allowed when the disk volume 112 is in a transitional state (for example, during a disk revive). If the user has a reason to move the disk drive and a disk revive is in progress, then the user can stop the revive after which the disk drive is moved. The disk revive is restarted by the operator once the disk drive has been moved.

The "Alter Disk" operation has many different options where the Mirror_Location attribute applies to the online disk remirroring. Therefore, the "Alter Disk" operation is changed to allow the Mirror_Location attribute to be executed even if one of the disk paths is in the Started state. In addition, a "Swap_Mirror" attribute is added to the "Alter Disk" operation.

The Mirror_Location attribute of the "Alter Disk" operation is used to add the location of the mirror disk drive in the disk volume 112. For brevity, the Mirror_Location attribute is used in this document to represent the MBACKUPLOCATION, MBACKUPSAC, Mirror_Location, and MIR- RORSAC attributes, which all affect the definition of the mirror disk drive. Consider that in certain embodiments: a) the user is given the option to start a disk revive once the reconfiguring is completed. b) The Mirror_Location attributes are not specified if the "Swap_Mirror" attribute is specified; and c) This operation is allowed when all the paths are in a Started state (online disk remirroring) or in a Stopped state (offline disk remirroring).

The "Swap_Mirror" attribute of the "Alter Disk" operation can cause the two disk drives of a mirrored disk volume 112 to switch roles; that is, the primary disk drive becomes the mirror disk drive and vice versa. Consider that in certain embodiments: a) the disk volume 112 should be mirrored for this operation to work; b) both disk drives should have the same number of paths; that is, both disk drives have—or do not have —backup paths; C) the Mirror_Location attribute is not specified if the "Swap_Mirror" attribute is specified; d) for offline disk remirroring, all configured disk path should be in a Stopped state; and for online disk remirroring, this operation is allowed when the disk paths are in specific states only. TABLE 10 shows illustrative legal states.

TABLE 10

Disk Legal States for Different Paths

| Primary Path (P) | Backup Path (B) | Mirror Path (M) | Mirror Backup Path (MB) |
|---|---|---|---|
| Started | Started | Started | Started |
| Started | Stopped | Started | Stopped |
| Stopped | Started | Stopped | Started |
| Stopped | Stopped | Started | Started |
| Started | Started | Stopped | Stopped |

In certain embodiments: the user can specify only a P path or an M path, and all paths for the disk drive (that include the Primary path (P), the Backup path (B), the Mirror path (M), and the Mirror-Backup path (MB) The disk drive should be stopped before one of these operation options is used.

The "Delete Disk" operation is changed to allow the mirror disk drive to be deleted while the disk volume 112 is in a Started state. The operation can continue to use the disk volume 112 in a Stopped state if the whole disk volume is to be deleted.

To delete the mirror disk drive, the user can issue the "Delete Disk" operation, thereby indicating that the mirror disk drive is to be removed from the configuration. Consider that in certain embodiments: a) all paths to the mirror disk drive (-M and -MB) should be in the Stopped state before this operation is used; b) if the primary disk drive is to be deleted, then the roles between the disk drives should first be switched using the "Alter Disk", "Swap_Mirror" operation; c) for offline disk remirronng, all configured disk path should be in a Stopped state; and d) for online disk remirroring, the -P and -B paths should be in a Started state while the -M and -MB paths should be in a Stopped state.

The Status Disk operation is amended with a Consistency option, which is used to verify whether the path configuration stored in the system-configuration database is equal to the path configuration used by the two disk processes (of the disk-volume process pair) and the two SCSI Interface Monitor processes.

The Status Disk, Consistency operation is issued at any time and can return the configuration information for the configured paths. In addition, information is displayed if there is a difference between the configuration information and the information from one of the other sources; that is, the disk process or the SCSI Interface Monitor.

Users can initiate configuration changes and prompts that the user can need to respond to. These illustrative embodiments assume that the user is running the system configuration facility in interactive mode (e.g., entering operations at the system configuration facility prompt), and may even be integrated within a Graphical User Interface (GUI) as is generally understood in computer technologies.

The "Autorevive" setting does not have any meaning when doing an Online Disk Remirroring since that setting requires that a disk-insertion event is sent to a storage subsystem manager process. This event triggers the storage subsystem manager to check this setting. In one embodiment, if the new disk drive is in place when the "Alter Disk" operation is given, then no insertion event is generated. If the new disk drive is not in place when the "Alter Disk" operation is given, then a storage warning is generated.

If the disk drive is inserted at a later time, then the disk revive is started automatically if the disk drive is an internal disk drive, and the "Autorevive" setting for the disk volume 112 is set to ON. If not, then the operator should start the disk revive manually using the "Start Disk" operation.

Errors and Error Recovery

The ODR mechanism 100 as described with respect to FIG. 1) in combinations with the different embodiments of the RAID disk drive reconfiguring processes 200 described with respect to FIGS. 2, 3a, 3b, 4a, and 4b are intended to provide an increased reliability to the redundant disk drive systems. This section of the disclosure describes a number of error and/or error recovery techniques that can be used to detect and recover from errors in one or more of the RAID disk drives. Recovery techniques rely on an error being detected in the middle of the RAID disk drive reconfiguring process 200. The error handling relies on the ODR mechanism 100 of FIG. 1 being configured as a process pair. One process of the process pair is completed and then analyzed for errors prior to the second process of the process pair being started. As such, if errors are detected in the first process, then the first process can be returned to its original state based on the contents of the second process. By comparison, if errors are detected in the second process (after the first process has been processed), then the second process can be completed using the values of the first process.

In one embodiment, after the first process and the second process have both been completed, the values of the first and the second process should be compared to each other. In those instances that the second process reflects (includes an identical process and identical input data) the first process, then the output data of the first process should be identical to the second process. If the output of the first process does not reflect the output of the second process in these instances, then it should be concluded that an error occurred in at least one of the processes. The first output and the second output values can then be analyzed, to determine where the error occurred, and corrected.

When an error is detected, the RAID system 102 thereby determines whether the data state in the disk array 104 as described with respect to FIG. 1 should be returned to the values prior to beginning the reconfiguring process, or whether the RAID disk drive reconfiguring process 200 should continue to its completion point, and the results with errors be applied to the disk array 104. If the RAID disk drive reconfiguring process 200 should continue to its completion point, then any errors in the disk array 104 are to be corrected following the completion point. One generalized embodiment of this error detection and error recovery technique has been described above with respect to 206, 208, 209, 210, and 212 in FIG. 2.

A number of events may be generated by the disk process file management during the RAID disk drive reconfiguring process 200 within the ODR mechanism 100. The events include both an ODR internal error indicator and an ODR recovery error indicator. ODR error messages is provided to the user that relate to ODR failures within the ODR mechanism 100. One embodiment of a generalized ODR error within the ODR mechanism 100 is provided as described in TABLE 11.

TABLE 11 generalized ODR error

LDEV logical-device Online Disk ODR-operation error.

In which:
  a) Logical-device represents the logical device number of the volume.
  b) ODR-operation includes such operations as add mirror disk drive, drop mirror disk drive, or swap states of mirror disk drive and primary disk drive.

Consider that the ODR-step includes, e.g., begin, reconfigure, or primary. The ODR-error-detail provides an error detail for an ODR-error. The ODR-processor represents a processor number of the pair that was processing ODR work within the ODR mechanism. The ODR-process-mode describes whether the reporting process was acting as the primary process, or the backup process.

The generalized embodiment of ODR error as shown in TABLE 11 is caused by some error occurring during some aspect of the RAID disk drive reconfiguring process 200. In one embodiment, the RAID disk drive reconfiguring process 200 within the ODR mechanism 100 may fail if a retry is not successful. Reliable error handling enhances the reliability of the ODR mechanism 100. With error handling processes in general, there is no recovery if there are no associated failures. If due to a soft-down disk process, the ODR mechanism 100 issues a manual abort of the operation. If the ODR error results from, e.g., a processor failure, the ODR_State within the ODR mechanism 100 is checked to determine whether the operation succeeded or failed. If necessary, the ODR mechanism 100 can re-issue the operation after reloading the failed processor. One embodiment of the recovery for an ODR error is described in TABLE 12.

TABLE 12

ODR recovery error

LDEV logical-device Online Disk ODR-operation recovery in which:
  a) Logical-device represents the logical device number of the volume.
  b) ODR-operation represents the add mirror disk drive, drop mirror disk drive, or swap states of mirror disk drive and primary disk drive.

Relative to TABLE 12, the ODR-step represents begin, reconfigure, or primary. The ODR-error represents an error. The ODR-error-detail represents the error detail. The ODR-processor includes the processor number of the pair that was processing ODR work within the ODR mechanism. The ODR-process-mode represents that the reporting process was acting as the primary process (or backup).

The cause of the ODR recovery error indicates the cause of an automatic or manual ODR operation recovery attempt failure. The effect of the ODR recovery error is that the ODR recovery attempt may fail within the ODR mechanism 100 if the retry is not successful. Within the ODR recovery error recovery due to a processor failure, check the ODR_State within the ODR mechanism 100 to determine if the operation succeeded or failed. If the operation failed, re-issue the operation after reloading the failed processor, if needed. An off line reconfiguring may be used to recover via the system configuration facility using the STOP, RESET, ALTER, and START operations as described in this disclosure.

The interfaces provided in TABLE 13 are used by the disk process file manager and the disk process driver components during the RAID disk drive reconfiguring process 200 as performed by the ODR mechanism 100. These and modified versions of these operations may also be used during the error detection and error recover procedures as described in this disclosure.

TABLE 13

ODR processing interfaces used by the ODR mechanism

| Driver Procedure | ODR Operation |
| --- | --- |
| Driver_Brother_Down_ | Breaks the link between processors for the Driver ODR_ State within ODR mechanism; and adds reason as parameters |
| Driver_Stop | Removes volume from internal disk process driver tables ODR; Reason can be passed as the reason. |
| Driver_Environment_ | Adds volume to internal disk process driver tables; New configuration is used for volume ODR Reason and ODR_State added as parameters within ODR mechanism |
| Driver_Initialize | Complete disk process driver initialization; No new parameters for ODR within ODR mechanism |
| Driver_Brother_Up_ | Establishes the link between processors for the Driver; ODR_State and reason added as parameters within the ODR mechanism |
| DriverStartSwitch | Starts the processor switch to the brother processor; ODR Reason used as the reason within the ODR mechanism |

The Driver_Stop_ODR operation acts to halt the RAID disk drive reconfiguring process 200. With the Driver_Stop_Normal operation, the disk process file management does not actually halt the RAID disk drive reconfiguring process 200, and can continue providing checkpoints from the primary disk drive to the backup processor.

Once the "Driver_Brother_Down" is called, input/output can not be provided via backup. This means that the volume may go down if there is path loss in the current primary processor. The down state is sent to the backup via checkpoint by the disk process file management.

There are a variety of inter-process communication messages that are associated with certain embodiments of the RAID disk drive reconfiguring process 200. A message interface is used to transfer the inter-process communication messages between the system configuration facility/storage subsystem manager and the disk process file management to control the RAID disk drive reconfiguring process 200 within the ODR mechanism 100. The message definition of each inter-process communication message is maintained in a database that is maintained by the system configuration facility/storage subsystem manager product. The illustrative fields of TABLE 14 for the inter-process communication messages are included in the ODR request structure.

TABLE 14

ODR request structures

| Field Name | Description |
|---|---|
| ODR_Action | Requested ODR action within the ODR mechanism, for example: ODR_Begin; ODR_Reconfigure; ODR_Primary |
| ODR_Reason | Reason for ODR action within the ODR mechanism, for example: Drop_Mirror; Swap_Mirror; Add_Mirror; NON_ODR_Operation; |
| ODR_Target | system configuration facility/storage subsystem manager ODR Target within the ODR mechanism: |
| ODR_State | system configuration facility/storage subsystem manager ODR_State within the ODR mechanism, for example: ODR Reconfig0; ODR Reconfig1; ODR Recovery |

The ODR_Reason operation provides an indication to the configuration change that is under way. The ODR_Target operation ensures the correct ODR_Target is selected (thereby limiting switching within the process).

The ODR_State is maintained by the system configuration facility/storage subsystem manager can keep track of the processor that is under reconfiguring. In one embodiment, an ODR_State of Reconfig0 means that the first processor is being worked on. An ODR_State of Reconfig1 or RECOVERY means the second processor is being worked on (with the first one being complete).

The use of abort state can result in the use of a full backup process stop and restart instead of the current driver stop and restart. This depends upon the current state of the primary process and backup processes. Illustrative actions performed for each RAID disk drive reconfiguring process 200 (similar to those described with respect to FIGS. 3a, 3b, 4a, and 4b) are shown in TABLE 15

TABLE 15

Actions Performed for each ODR Action

| ODR Action | ODR_State/Error Recovery |
|---|---|
| BEGIN | Verify the disk process State<br>Target is the primary process<br>Primary and Backup processes fully functional<br>Mirror disk drive in correct state for operation<br>Checkpoint ODR begin to backup processor<br>Verifies state in backup processor<br>Stops the disk process thread in backup<br>Call Driver_Brother_Down_<br>ODR_State and reason included in call<br>Reply to ODR request<br>Error may use retry or abort |
| RECONFIGURE | Verify the disk process State<br>Target is the backup process<br>Primary process and backup processes fully functional and in ODR_State<br>Call Driver_Brother_Down_<br>ODR_State and reason included in call<br>Call Driver_Stop<br>Initiates the driver shutdown for the volume in the backup processor<br>Call Driver_Environment<br>Driver establishes configuration<br>Call Driver_Initialize<br>Establishes volume state<br>Restart the disk process thread<br>Request queued until all disk process thread are started<br>Reply to ODR request<br>Error may use retry or abort |

TABLE 15-continued

Actions Performed for each ODR Action

| ODR Action | ODR_State/Error Recovery |
|---|---|
| PRIMARY | Verify the disk process State<br>Target is the primary process<br>Primary and backup processes fully functional and in ODR_State<br>Call DRIVER_BROTHER_UP_<br>With ODR reason and state<br>Call DRIVERSTARTSWITCH<br>With ODR reason for step 0, else give-configured<br>Note that the processor switch is no-waited and may not occur<br>Reply to ODR request<br>Error may use retry or abort |

If the value of the ODR_State as described in TABLE 15 is greater than zero, there is a presumption that any error can leave the volume in an inconsistent state. An inconsistent state is defined to be where the processes in each processor are running with different configurations. The system configuration facility can automatically attempt to resolve the inconsistency with a recovery attempt, when possible. Exceptions to this are processor failures where the remaining process is running the old configuration (presume abort) or the new configuration (presume success).

One embodiment of the ODR reply structure that relates to the disk process (DP) includes the fields shown in TABLE 16.

TABLE 16

ODR Reply Structure

| Field Name | Description and Potential Illustrative Values |
|---|---|
| DP_ERROR | No error; Disk process file manager state error; Disk process file manager wrong target; Disk process file manager FS error; Disk process soft down error; Disk process file manager process create failure; Measure active for volume; Driver environment error; Driver initialize error; and Driver start switch error. |
| DP_ERROR_DETAIL | None; Greater than 0 = error; Invalid operation error; DEVDOWN; Invalid state error; processor Failure error. |
| DP_RETRY_DETAIL | No retry possible, abort possible; No retry possible, no abort possible; Retry operation; and Delay and retry. |
| DP_DRIVER_STATE | Driver state okay; Driver Brother Link down; Driver disk process file manager Link down |

The recovery action used depends upon the state of the disk drive volume. The following table provides the recovery action for each step in the RAID disk drive reconfiguring process 200. Any retry or delay and retry return should be counted, and a minimum number of retries should be attempted.

Any error related to processor or soft-down failure of either the primary or backup can cancel the RAID disk drive reconfiguring process 200. For processor failure, the current configuration state in use by the remaining processor can determine if the RAID disk drive reconfiguring process 200 was successful or aborted.

If an error occurs during reconfigure, the storage subsystem manager should perform an "ODR_Primary" operation to ensure cleanup of the disk process. This can not result in any processor switch, since the disk process can retain the failure state and avoid any processor switch. An error should be returned to the primary request, without any retry; or manually by some system configuration facility operation. TABLE 17 provides one illustrative embodiment of a reconfiguring recovery action for an ODR mechanism.

TABLE 17

Reconfiguring recovery action for ODR mechanism

| Potential ODR Actions | |
| --- | --- |
| | Recovery Action For Reconfigure Phase 0 (the first processor is being worked on) |
| Begin | ODR cancelled, there is no recovery processor or soft-down processing Illegal |
| Reconfigure | processor or soft-down processing ODR cancelled, issue Primary operation, execute recovery ODR cancelled, issue Primary operation, execute recovery |
| Primary | processor or soft-down processing ODR cancelled, execute recovery ODR cancelled, execute recovery |
| | Recovery Action for Reconfigure Phase 1 (the second processor is being worked on, and the first one is complete) |
| Begin | processor or soft-down processing ODR cancelled, execute recovery Illegal |
| Reconfigure | processor or soft-down processing Issue Primary, Execute recovery, if successful, ODR complete Issue Primary, Execute recovery, if successful, ODR complete |
| Primary | processor or soft-down processing Execute recovery, if successful, ODR complete Execute recovery, if successful, ODR complete |

The ODR recovery process is performed automatically by the storage subsystem manager. If the ODR recovery request is sent to the disk process, the following steps are performed: a) stop the backup process (e.g., using the "Begin_ODR" operation); b) restart the backup process (e.g., using the "ODR_Reconfigure" operation sent to the primary); and c) switch to the backup process (e.g., using the "ODR_Primary" operation). In one embodiment, the correct configuration state is established by returning the configuration state back to the volume in the processor prior to performing the recovery operation. Any failures can cancel the recovery operation that is reported to the user.

The ODR Recovery request is sent to the current primary processor disk process process, and it can operate on the current backup processor disk process process. The ODR Recovery request restores an inconsistent backup processor process to a state that is consistent with the current primary processor process. The correct configuration may be new or old. The abort operation restores the full non-stop function. The correct configuration is that configuration currently in use in the primary processor process. Errors that use an abort process are not expected, since most errors are the result of processor or soft-down failures. A softdown failure is a internal software failure that removes the thread(s) from service, and forces an unplanned switch to the backup threads.

Any processor failures that occur during the RAID disk drive reconfiguring process 200 may be related to the attempt to perform the ODR operation. Upon such failures, the RAID disk drive reconfiguring process 200 is declared successful if the volume is successfully loaded using the new configuration. The RAID disk drive reconfiguring process 200 is aborted if the volume uses the old configuration. If the volume is in a down state after a processor failure, the recommended action may be to reset and restart the volume, after reverting to the prior configuration. Internally detected failures can result in a soft-down disk process member. Once this occurs, the ODR processing is discontinued. The soft down state may or may not be related to the ODR process.

One embodiment of aborting is to support an ODR abort request (that can shut down the processes and restart them) as needed. The system configuration facility/storage subsystem manager should perform the abort processes in both processors (both processors are stopped and restarted). This can avoid the need to determine which processors are soft down, and which have the old or new configuration.

If the driver does not checkpoint the UP state, and the primary moves to a soft down state, the volume is moved to a down state. This continues to use an abort to stop and re-start the processes. It may be possible to use the RESET and the START operation to recover for this case, since the volume is in a down state. A test program is used to verify the disk process file manager and driver functions.

The processing of the different system events (one embodiment shown in TABLE 18) is specific to each event and is not directly relevant to the ODR processing design. Therefore, this processing is not described any further in this document. The processing of SPI operations differs depending on what operation was received but there is a common method that is used for most if not all operations.

TABLE 18

Operation processing flow

1. Unpack and validate the content of the programmatic command buffer.
2. Depending on operation and object type (disk, tape, etc), invoke the applicable operation, which does the following (a to c):
    a. Retrieve and validate operation-specific attributes from the SPI buffer.
    b. Obtain status information for, in this case, the disk volume being managed.
    c. Check that the disk volume is in the correct state for the operation.
3. Invoke the processing operation by transmitting context data. This is done since most interactions with different I/O processes are done using blocking functions.
4. Performing the actual interaction with the I/O processes, the system-configuration database, the file system, etc. Once completed, the result of this processing is returned back to the storage subsystem manager.
5. The storage subsystem manager evaluates the result and builds a SPI buffer that is returned to the Subsystem Control Point (SCP).

This portion of the disclosure applies relates errors and error recovery more particularly to system facilities. A variety of system configuration facility errors that might be generated within the (ODR) mechanism 100 are now described. The cause of the "Disk Not Mirrored" error is that the operation is not supported for a non-mirrored disk volume 112. The effect of the "Disk Not Mirrored" error is that the operation is not executed, and the system configuration facility waits for the next operation. The recommended action of the "Disk Not Mirrored" error is that this operation is not performed on the specified disk.

In certain embodiments, the error text is adjusted depending on the source of the error and the effect of the error. The cause of this message is that an error occurred when changing the configuration. The effect of the error is that the configuration change did not occur. The "Configuration Status" indicates whether the configuration information is consistent in the processes in which the disk process is running. One recommended action is to determine whether to retry the operation.

Once the error-detail portion of the error message has been addressed, the user can either reissue the operation indicating the desired new configuration, or reissue the operation indicating the previous configuration.

In the "disk not mirrored" error, the configuration change did succeed (i.e., the desired configuration is in use). However, the configuration information in the process that contained the original primary disk process when the operation was entered was not updated properly. The cause of the "Disk Not Mirrored" error is that an error occurred when changing the configuration. With the "Disk Not Mirrored" error, the configuration was changed but in one process only. The error message indicates which subsystem encountered the error, what the error was, and which process was affected by the error. A recommended action of the "Disk Not Mirrored" error is to make the configuration change which caused the configuration information in the indicated process to become invalid. Because of this, fault tolerance might be lost. For example, the backup disk process (the original primary process) may no longer be able to access the mirror disk drive.

Depending on the error indicated in the error- and error-detail portion of the message, the user can reissue the operation indicating the desired new configuration, or reissue the operation indicating the previous configuration. Using the original configuration can cause the storage subsystem manager to attempt to undo the configuration back to the original setting.

One example of an "Alter Disk" error may state: "Wrong state for DISK State: Started". This error can result from attempting to perform an action that is illegal for the specified disk volume 112. The effect of this error is that the operation is not executed. The system configuration facility waits for the next operation.

There are a variety of embodiments of implementation details to the RAID disk drive reconfiguring process 200 that may include all or some of the following:

I. The processing that is done when adding a mirror disk drive to an unmirrored disk volume.

II. The processing that is done when deleting a mirror disk drive from a mirrored disk volume.

III. The processing that is done when switching roles between the primary and mirror disk drives of a mirrored disk volume.

IV. The processing performed when adding or deleting a mirror disk drive from a disk volume, or when swapping the roles of the two disk drives.

V. The processing that is done when power a disk drive on or off.

VI. Step-by-step error handling.

VII. Test instrumentation.

In one embodiment, the disk power off and disk power on processing is implemented as an extension of the current "Control Disk" operation. The power-related operations are supported for internal disks only since there is no way to tell an external disk drive to power on or off. The power-related operations for internal disks are handled by the Service Process. The power-related attributes of the "Control Disk" operation is handled in this manner:

a) Initial operation processing is as described. The parsing for the "Control Disk" operation can allow three additional attributes to be specified: 1) Power_Off 2) Power_On 3) Power.

b) Once the programmatic command buffer has been parsed, the "Disk_control_init" operation is invoked. This operation is changed to allow one new values for the Control-Attribute and the Control-Power. If the Control-Attribute contains the Control-Power, the control can eventually be passed to a new "Disk_control_power" operation, which is responsible for the remaining SPI-buffer parsing. Among other things, this operation which check that the PATH token is present and contains either DEVICEPATH-PRIMARY or DEVICEPATH-MIRROR, that the Power-VALUE is present and contains either VAL-ON or VAL-OFF, and that the disk drive is an appropriate state for the power operation to be issued. (Internal disk, both paths in a stopped state, the present bit on, etc,)

c) Once the SPI buffer has been validated, the Disk_control_power operation can do a push down to an storage subsystem manager invoking a new Disk_Power_operation.

One consideration of the RAID mechanism design relates to determining how errors is handled. There are situations where the configuration information in the storage subsystem manager, the disk process, the driver, and the SCSI Interface Monitor (SIFM) can become out-of-sync.

Any ODR mechanism 100 and/or RAID disk drive reconfiguring process 200 design should be configured to expect that such an out-of-sync situation might occur, and be able to clean up any out-of-sync situation. When an out-of-sync situation occurs, the backup disk process should go into a soft-down state, allowing it to reply with a configuration-is-inconsistent error. (An Event Management System event should be generated the first time this is detected). To address this error, the user should delete the configuration and then add the disk back into the system-configuration database.

The primary disk process can not go into a soft-state since it should encounter a configuration-is-inconsistent error due to an Online Disk Remirroring (ODR) action. Therefore, continued application access is provided.

The ODR mechanism 100 should be able to handle out-of-sync replies. When a configuration inconsistency is detected, it is desired that the backup disk process goes into a soft-down state and replies with a configuration-is-inconsistent error. The backup disk process with its associated Driver and the SIFM all have to reply with a configuration-is-inconsistent error if a configuration inconsistency is detected—they cannot call halt. The backup disk process should generate an Event Management System event when the error is detected and go into a soft-down state (that indicates the backup disk can no longer do anything but reply with the configuration-is-inconsistent error, reply to device-info request, and accept a stop message.

The primary disk process can have good configuration information. It can have access to the primary disk drive and maybe the mirror disk drive. In one embodiment, the role between the primary and backup disk process is not switched until the configuration change succeeds in the backup process. Therefore, if the configuration change fails prior to the first ownership switch, the original configuration is still valid in the primary disk process. If the configuration change fails after the first ownership switch, the primary disk process contains the new configuration information.

To clean up the configuration inconsistency, the user should issue operations from the system configuration facility. As documented in the system configuration facility Error Messages above, the normal corrective action is to use the "Alter Disk" or the "Delete Disk" operation to correct the invalid configuration. If this action fails, an application outage can occur and the user should reconfigure the disk from scratch, which is the topic of this subsection.

If an error occurs, the user is asked to use the system configuration facility "Alter Disk" or "Delete Disk" operation to remedy the situation. Therefore, the storage subsystem manager is designed to allow the same operation to be used several times to, for example, retry a configuration change. It is possible that a process failure occurs during an online disk drive re-mirroring. This disclosure describes what actions can be taken depending on which process failed and where in the processing the process failure occurred. The storage subsystem manager can detect a process failure using this operation:

1. ODR_Begin. The disk process can return an error indicating that it's not running as a process pair.
2. Prepare To Delete Mirror Drive In Backup. The SCSI Interface Monitor (SIFM) support operation can return an error indicating that the target process is not running.
3. Delete Mirror Drive In Backup. The SIFM support operation can return an error indicating that the target process is not running.
4. Update Path Information In Backup. The SIFM support operation can return an error indicating that the target process is not running.
5. Update Path Information In Primary. The SIFM support operation can return an error indicating that the target process is not running.
6. ODR_Reconfigure. The disk process can return an error indicating that it's not running as a process pair.
7. ODR_Primary. The disk process can return an error indicating that it's not running as a process pair.

If a process fails, the storage subsystem manager can use the server operation for the Status Disk, Consistency operation to determine the current state of the system-configuration database record, the disk process, and the SIFM. Given that there's no way to revert the disk process' configuration at this point, the storage subsystem manager can take appropriate states to change the SIFM configuration and system-configuration database to match the path configuration returned by the disk process in the surviving process.

If the primary process loses access to the disk drive, in one embodiment the processing of the RAID disk drive reconfiguring process 200 is aborted. That is, the configuration is returned to whatever known state is applicable, and the user is informed that an error occurred. The reasoning behind this approach is that it is likely that the backup disk process can not be able to access the disk drive(s) if the primary disk process loses access to the disk drive(s), it is unlikely that this situation can ever happen at a user site, and alternate error handling such as trying to switch to the backup disk process to attempt to recover from the situation may be more complicated.

Therefore, in one embodiment of the ODR mechanism 100, when the primary disk process loses access to the disk drive(s):

a) All paths are placed in a stopped state, and in a HARDDOWN state in which the current RAID states are maintained pending determination of which RAID states to maintain.
b) The disk process invokes the disk process recovery internally to clean up its internal states.
c) The disk process responds to the storage subsystem manager with an error that the RAID disk drive reconfiguring process was aborted due to external circumstances.
d) If necessary, the storage subsystem manager changes the SIFM changes back to the original values.
e) The storage subsystem manager responds by providing an error message to the user.

A "disk process recovery" is part of the requests that are supported by the disk process. Recovery requests are sent to the disk process whenever the storage subsystem manager detects that the RAID disk drive reconfiguring process is to be cancelled. Upon receipt, the disk process can perform whatever actions are needed to clean up after the processing of the RAID disk drive reconfiguring process, for example, start disk process threads and invoke the "Driver_BROTHER_Up" operation to reestablish the link between the driver in the primary and the backup disk processes. When used in this fashion, the storage subsystem manager is responsible for generating appropriate Event Management System events indicating the reason for the cancelled ODR processing.

The disk process can also use this operation when it detects a situation that causes the disk process to cancel the RAID disk drive reconfiguring process 200 by itself. In those cases, the disk process can invoke the ODR-recovery processing after which it responds with an error to the storage subsystem manager, indicating that the RAID disk drive reconfiguring process 200 has been cancelled. When used in this fashion, the disk process is responsible for generating appropriate Event Management System events indicating the reason for the cancelled RAID disk drive reconfiguring process 200. The storage subsystem manager invokes the disk process recovery as three steps which are invoked in sequence with the action value set to "recovery" as follows: "ODR_Begin", "ODR_Reconfigure", and "ODR_Primary".

The following actions are common to all error handling:

a) Where appropriate, an appropriate error message contains the underlying file-system error.
b) Actions are retried if a retry is considered harmless.
c) If the disk process detects a reason to cancel the processing of the RAID disk drive reconfiguring process (for example, encounters an error), then the disk process can invoke the disk process-recovery processing. The disk process-recover process can return the state of the process to the state prior to the reconfiguring process, and reply with an error (e.g., to the storage subsystem manager) that indicates the error and how the error was handled.
d) If the storage subsystem manager fails to return the SIFM configuration to its original values, then the error message can inform the user that the SIFM configuration is invalid. The Status Disk, Consistency can cause the storage subsystem manager to compare the content of the system-configuration database record with the result from a "CONFIG_GETDEVICEINFO_" call and the SIFM configuration information and, if they differ, display the different values together. The RAID disk drive reconfiguration can then use a variety of techniques to determine which states to rely upon. Note that parts a) to d) largely follow the error detection described in this disclosure relative to FIG. 2.
e) If a reservation record was created as part of the processing of the ODR program (e.g., "Add_Location") and the error occurs before the first ownership switch, then the storage subsystem manager deletes the reservation record prior to responding the operation message.

f) If a processes fails:

The storage subsystem manager queries the disk process and the SIFM to learn what their respective view of the path configuration is and what the appropriate recovery action is.

The remaining disk process (the former backup disk process) can commence I/O right away. This is because the "Driver_Brother_Down" operation does not "Disable I/O in the Backup"—it made the Driver in the primary disk process to consider the backup disk process down only.

The disk process invokes the disk process-recovery processing as part of its takeover processing.

Table 19 describes how errors such as a failure of a backup process are handled in one embodiment of ODR mechanism 100.

TABLE 46

Recovery Actions For Error Handling

| STEP | INVOKED . . . | RECOVERY ACTION |
|---|---|---|
| Operation parsing | When they user has typed an system configuration facility operation and the Storage system configuration facility Product Module has sent the operation information in a SPI buffer to the storage subsystem manager. | No special error handling needed, the storage subsystem manager replies with an error. |
| ODR_Begin | 1. Prior to reconfiguring the SCSI Interface Monitor (SIFM),<br>2. After reconfiguring the SIFM; or<br>3. After calling first "ODR_Primary" operation. | The storage subsystem manager replies to the operation message with error message indicating that the disk process action had an error, and undoes the SIFM configuration in appropriate process(s) before replying to the operation message. |
| Reserve Location In Database | After operation processing when "Alter Disk" $name, Mirror_Location has been specified, | No special error handling needed. the storage subsystem manager replies with an error. |
| Reconfigure SIFM In Backup | 1. Before calling the "Begin_ODR" operation,<br>2. After calling the "Begin_ODR" operation but before calling the first "ODR_Primary" operation, or<br>3. After calling the first "ODR_Primary" operation. | The storage subsystem manager replies to the operation message with error message, invokes the ODR-recovery processing, replies to the operation message, and invokes the ODR-recovery processing. |
| Reconfigure SIFM In Primary | Before calling the "Begin_ODR" operation. | The storage subsystem manager replies to the operation message with error message. |
| Prepare To Delete Mirror disk drive In SIFM | 1. Before calling the first "ODR_Primary" operation and before reconfiguring the Disk Driver in the backup disk process, or<br>2. After calling first "ODR_Primary" operation and before reconfiguring the Disk Driver in the backup disk process. | The storage subsystem manager invokes the ODR-recovery processing and replies to the operation message with error message and invokes the ODR-recovery processing and replies to the operation message. |
| Delete Mirror disk drive In SIFM | 1. Before calling the first "ODR_Primary" operation and after reconfiguring the Disk Driver in the backup disk process, or<br>2. After calling the first "ODR_Primary" operation and after reconfiguring the Disk Driver in the backup disk process. | The storage subsystem manager invokes the ODR-recovery processing and replies to the operation message with error message, and invokes the ODR-recovery processing and replies to the operation message. |
| ODR_reconfigure | 1. As part of the first pass through the ODR processing. (This is the first time "ODR_Reconfigure" is invoked), or<br>2. As part of the second pass through the ODR processing. (This is the second time "ODR_Reconfigure" is invoked.) | The storage subsystem manager undoes the SIFM configuration in appropriate process(s) before replying to the operation message with error message, and replies to the operation message indicating that the configuration of the backup disk process is invalid. (Note: the disk process should have restarted the backup disk process to try to fix this situation.) |

TABLE 46-continued

Recovery Actions For Error Handling

| STEP | INVOKED... | RECOVERY ACTION |
|---|---|---|
| ODR_primary | 1. As part of the first pass through the ODR processing. (This is the first time the "ODR_Primary" operation is called), or<br>2. As part of the second pass through the ODR processing. (This is the second time the "ODR_Primary" operation is called.) | The storage subsystem manager undos the SIFM configuration in appropriate processes, invokes the ODR-recovery processing and replies to the operation message with error message and generates replies to the operation message. |
| Update Configuration Database | After the second call to the "ODR_Primary" operation has completed. | The storage subsystem manager simply returns error message indicating that the system-configuration database information is invalid. |

The following table describes how a failure of the primary disk process is handled in one embodiment of ODR 100.

TABLE 19

Handling Failure of Primary Disk Process

| STEP | INVOKED... | RECOVERY ACTION |
|---|---|---|
| Operation parsing | When they user has typed a system configuration facility operation and the Storage system configuration facility Product Module has sent the operation information in a SPI buffer to the storage subsystem manager. | No special error handling needed, the storage subsystem manager replies with an error message. |
| ODR_Begin | 1. Prior to reconfiguring the SIFM,<br>2. After reconfiguring the SIFM, or<br>3. After calling the first "ODR_Primary" operation. | The storage subsystem manager replies to the operation message with error message indicating that the Disk Process action had an error. The storage subsystem manager undos the SIFM configuration in appropriate process(s) before replying to the operation message. |
| Reserve Location In Database | After operation processing when "Alter Disk" $name, Mirror_Location has been specified, | No special error handling needed, today's methods can work fine: if the record insert fails, the storage subsystem manager replies with an error. |
| Reconfigure SIFM In Backup | 1. Prior to "Begin-ODR",<br>2. After "Begin-ODR" but before ownership switch, or<br>3. After ownership switch. | The storage subsystem manager replies to the operation message with error message. If the SIFM configuration has been updated but the disk-process configuration has not: the storage subsystem manager undos the SIFM configuration in appropriate process(s), generates an Event Management System event, and replies to the operation message with error message.<br>If both the SIFM and the disk-process configuration have been updated: the storage subsystem manager updates the system-database configuration and replies to the operation message with error message, indicating that the disk process is no longer running as a process pair.<br>The storage subsystem manager updates the system-database configuration and replies to the operation message with error message, indicating that the disk process is no longer running as a process pair. |
| Reconfigure SIFM In Primary | Before calling the "Begin_ODR" operation. | The storage subsystem manager replies to the operation message with error message. |

TABLE 19-continued

Handling Failure of Primary Disk Process

| STEP | INVOKED . . . | RECOVERY ACTION |
|---|---|---|
| Prepare To Delete Mirror disk drive In SIFM | 1. Before calling the first "ODR_Primary" operation and before reconfiguring the Disk Driver in the backup disk process, or<br>2. After calling first "ODR_Primary" operation and before reconfiguring the Disk Driver in the backup disk process. | The storage subsystem manager undos the SIFM configuration in appropriate process(s) and replies to the operation message with error message.<br>The storage subsystem manager updates the system-database configuration and replies to the operation message with error message, indicating that the disk process is no longer running as a process pair. |
| Delete Mirror disk drive In SIFM | 1. Before calling the first "ODR_Primary" operation and after reconfiguring the Disk Driver in the backup disk process, or<br>2. After calling the first "ODR_Primary" operation and after reconfiguring the Disk Driver in the backup disk process. | In both cases, the storage subsystem manager reissues the call to the SIFM_ALTER_CONFIG_LDEV_operation specifying ZSTO-VAL-DELETE-MIRROR DISK DRIVE, updates the system-database configuration and replies to the operation message with error message, indicating that the disk process is no longer running as a process pair. |
| ODR_ reconfigure | 1. As part of the first pass through the ODR processing. (This is the first time, "ODR_Reconfigure" is invoked), or<br>2. As part of the second pass through the ODR processing. (This is the second time "ODR_Reconfigure" is invoked.) | If the SIFM configuration has been updated but the disk-process configuration has not: the storage subsystem manager undos the SIFM configuration in appropriate process(s), generates an Event Management System event, and replies to the operation message with error message. If both the SIFM and the disk-process configuration have been updated: the storage subsystem manager updates the system-database configuration and replies to the operation message with error message, indicating that the disk process is no longer running as a process pair.<br>The storage subsystem manager updates the system-database configuration and replies to the operation message with error message, indicating that the disk process is no longer running as a process pair. |
| ODR_ primary | 1. As part of the first pass through the processing of the RAID disk drive reconfiguring process (this is the first time "ODR_Primary" operation is called), or<br>2. As part of the second pass through the processing of the RAID disk drive reconfiguring process (this is the second time "ODR_Primary" operation is called.) | The storage subsystem manager updates the system-database configuration and replies to the operation message with error message, indicating that the disk process is no longer running as a process pair.<br>The storage subsystem manager updates the system-database configuration and replies to the operation message with error message, indicating that the disk process is no longer running as a process pair. |
| Update Configuration Database | | The storage subsystem manager replies to the operation message with error message, indicating that the disk process is no longer running as a process pair. |

Different embodiments of the storage subsystem manager are equipped with specific test interfaces. The test instrumentation can be available on multiple levels including: a) a per operation-level basis that can allow failures to be induced during specific steps in the operation processing; and b) a subsystem level to allow failures to be induced during the non-operation portions of the storage subsystem manager processing, for example, when handling certain system messages.

V. Conclusion

Although the disclosure is described in language specific to structural features and methodological steps, it is to be understood that the disclosure is not necessarily limited to the specific features or steps described. Rather, the specific features and steps disclosed represent different forms of implementing the disclosure.

The invention claimed is:

1. A method of reconfiguring a RAID (redundant array of inexpensive disks) system, comprising:

detecting an error during a reconfiguration process of the RAID system;

determining if the error was generated by a first process or a second process, wherein the first process controls operation of a primary disk within the RAID system and the second process controls operation of a mirror disk within the RAID system, and wherein the mirror disk mirrors the primary disk;

if the error was generated by the first process, then:
 returning the first process and primary disk to an original state; and if the error was generated by the second process, then:
 continuing to completion of the reconfiguration process; and
 correcting errors after the completion.

2. The method of claim 1, wherein the first and second processes each have separate operating system images.

3. The method of claim 1, wherein while one of the first and second processes is reconfigured, the other of the first and second processes maintains the primary disk or the mirror disk, respectively, and the RAID system is maintained on-line at all times during the reconfiguration process.

4. The method of claim 1, wherein the reconfiguration process comprises adding a mirror drive to the RAID system.

5. The method of claim 1, wherein the reconfiguration process comprises removing a mirror drive from the RAID system.

6. The method of claim 1, wherein returning to the original state is performed by inverse operations of the reconfiguration process.

7. The method of claim 1, wherein returning to the original state comprises retrieval of stored original values.

8. A method of reconfiguring a RAID (redundant array of inexpensive disks) system, comprising:
 controlling operation of a primary disk and a mirror disk within the RAID system with a first process and a second process, respectively, wherein the mirror disk mirrors the primary disk;
 reconfiguring the RAID system, wherein at least one of the first process and the primary disk or the second process and the mirror disk, is maintained on-line at all times while the other process and disk is reconfigured; and
 receiving indication of an error; and
 deciding, in response to the error, between returning to an original state of the primary disk and the mirror disk or alternatively continuing the reconfiguration to completion, wherein the deciding is based in part on a degree to which the reconfiguring has progressed and in part the type of error received.

9. The method of claim 8, wherein the reconfiguration comprises adding or removing a mirror drive to the RAID system.

10. The method of claim 8, wherein the reconfiguration comprises switching between a primary drive and a mirror drive.

11. The method of claim 8, wherein returning to the original state comprises performance of operations inverse to the reconfiguration.

12. The method of claim 8, wherein returning to the original state comprises retrieval of stored original values.

13. The method of claim 8, wherein the deciding is based in part on whether the error was generated by the first process, controlling operation of the primary disk, or the second process, controlling operation of the mirror disk.

14. The method of claim 8, additionally comprising, after receiving the error, returning to the original state if the reconfiguring is not substantially complete and completing the reconfiguring if the reconfiguring is substantially complete.

15. The method of claim 8, wherein first and the second processes comprise a process pair configured to allow reconfiguration of one process at a time while the other process keeps the RAID system on-line and to allow roll-back to the original state.

16. The method of claim 8, wherein continuing the reconfiguration to completion is followed by correcting the error.

17. A processor readable media defining processor readable instructions for reconfiguring a RAID (redundant array of inexpensive disks) system, wherein instructions comprise instructions for:
 controlling operation of a primary disk and a mirror disk within the RAID system with a first process and a second process, respectively, wherein the mirror disk mirrors the primary disk;
 reconfiguring the RAID system, wherein one of the first process and the primary disk and the second process and the mirror disk, is maintained on-line at all times while the other process and disk is reconfigured; and
 receiving indication of an error; and
 deciding, in response to the error, between returning to an original state of the primary disk and the mirror disk or alternatively continuing reconfiguration to completion, wherein the deciding is based in part on a degree to which the sequence has progressed and in part the type of error received.

18. The processor readable media of claim 17, wherein the reconfiguration comprises adding or removing a mirror drive to the RAID system.

19. The processor readable media of claim 17, wherein returning to the original state is performed by either, retrieving original values from the original state from storage separate from values generated by the reconfiguring, or by following an inverse operation of the reconfiguring process.

20. The processor readable media of claim 17, wherein the deciding is based in part on whether the error was generated by the first process, controlling operation of the primary disk, or the second process, controlling operation of the mirror disk.

21. The processor readable media of claim 17, additionally comprising, after receiving the error, returning to the original state if the reconfiguring is not substantially complete and completing the reconfiguring if the reconfiguring is substantially complete.

22. The processor readable media of claim 17, wherein first and the second processes comprise a process pair configured to allow reconfiguration of one process at a time while the other process keeps the RAID system on-line and to allow roll-back to the original state.

23. The processor readable media of claim 17, wherein continuing the reconfiguration to completion is followed by correcting the error.

24. The processor readable media of claim 17, wherein returning to the original state comprises retrieval of stored original values.

25. The processor readable media of claim 17, wherein returning to the original state comprises inverting the instructions for reconfiguring the RAID system.

26. The processor readable media of claim 17, additionally comprising:
 backing the first process out, to thereby return to the original state, if the first process does not contain sufficient configuration state information upon error detection; or
 finishing operation of the second process, to thereby reconfigure the RAID system, if the reconfiguring process is substantially complete, and subsequently correcting detected errors.

* * * * *

UNITED STATES PATENT AND TRADEMARK OFFICE
CERTIFICATE OF CORRECTION

| | |
|---|---|
| PATENT NO. | : 7,370,248 B2 |
| APPLICATION NO. | : 10/704478 |
| DATED | : May 6, 2008 |
| INVENTOR(S) | : Gunnar Tapper et al. |

It is certified that error appears in the above-identified patent and that said Letters Patent is hereby corrected as shown below:

In column 2, line 40, delete "he" and insert -- be --, therefor.

In column 6, line 40, after "continues" insert -- by --.

Signed and Sealed this

Twelfth Day of August, 2008

JON W. DUDAS
*Director of the United States Patent and Trademark Office*